US009253337B2

(12) United States Patent
Sugiyama

(10) Patent No.: US 9,253,337 B2
(45) Date of Patent: Feb. 2, 2016

(54) PROGRAM, IMAGE PROCESSING APPARATUS, AND IMAGE PROCESSING SYSTEM

(71) Applicant: Takashi Sugiyama, Okazaki (JP)

(72) Inventor: Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 94 days.

(21) Appl. No.: 13/851,415

(22) Filed: Mar. 27, 2013

(65) Prior Publication Data

US 2013/0321832 A1    Dec. 5, 2013

(30) Foreign Application Priority Data

May 29, 2012    (JP) .................................. 2012-122462

(51) Int. Cl.
*G06F 3/12*    (2006.01)
*H04N 1/00*    (2006.01)

(52) U.S. Cl.
CPC ......... *H04N 1/00029* (2013.01); *H04N 1/0005* (2013.01); *H04N 1/00007* (2013.01); *H04N 1/00037* (2013.01); *H04N 1/00061* (2013.01); *H04N 1/00076* (2013.01); *H04N 1/00832* (2013.01); *H04N 1/00204* (2013.01); *H04N 2201/0094* (2013.01)

(58) Field of Classification Search
None
See application file for complete search history.

(56) References Cited

U.S. PATENT DOCUMENTS

| 2006/0044572 | A1* | 3/2006 | Nakayama | ..................... | 358/1.1 |
| 2008/0080887 | A1* | 4/2008 | Suzuki | ............................ | 399/81 |
| 2009/0225366 | A1* | 9/2009 | Emori | .......................... | 358/1.15 |
| 2009/0313683 | A1* | 12/2009 | Murakawa | ........................ | 726/5 |
| 2011/0170134 | A1* | 7/2011 | Murashima | .................. | 358/1.15 |
| 2011/0299859 | A1* | 12/2011 | Lee | .................................. | 399/8 |

FOREIGN PATENT DOCUMENTS

| JP | 11-134136 A | 5/1999 |
| JP | 2002-297349 A | 10/2002 |
| JP | 2007-053778 A | 3/2007 |
| JP | 2008-213303 A | 9/2008 |
| JP | 2010-157929 A | 7/2010 |

* cited by examiner

*Primary Examiner* — John Wallace
(74) *Attorney, Agent, or Firm* — Scully, Scott, Murphy & Presser, P.C.

(57) ABSTRACT

There is provided an image processing apparatus including a communication unit configured to communicate with an information processing apparatus, a processor; and memory storing computer-readable instructions, when executed by the processor, causing the image processing apparatus to perform acquiring error information indicating an error occurring in the image processing apparatus and usage information of the image processing apparatus, determining whether to transmit, via the communication unit, the acquired error information to the information processing apparatus based on the acquired usage information, and transmitting the acquired error information to the information processing apparatus if it is determined to transmit the acquired error information.

24 Claims, 17 Drawing Sheets

| FUNCTION | STATUS |
|---|---|
| PRINT | NO BLACK TONER |
| SCAN | NO ERROR |
| FAX TRANSMISSION | NO ERROR |
| FAX RECEPTION | NO ERROR |

240

241

| USER NAME | REMAINING NUMBER OF PRINT TIMES | REMAINING NUMBER OF SCAN TIMES | FAX TRANSMISSION ALLOWED |
|---|---|---|---|
| USER A | 95 | 10 | YES |
| USER B | 100 | 55 | YES |
| USER C | 0 | 5 | NO |
| USER D | 0 | 0 | YES |

PROGRAM, IMAGE PROCESSING APPARATUS, AND IMAGE PROCESSING SYSTEM

CROSS-REFERENCE TO RELATED APPLICATION

This application claims priority from Japanese Patent Application No. 2012-122462, filed on May 29, 2012, the entire subject matter of which is incorporated herein by reference.

TECHNICAL FIELD

Aspects of the present invention relate to a program, an image processing apparatus, an image processing system, and an error notifying method. Specifically, aspects of the present invention relate to an error notifying technique for notifying error information such as contents of an error and a solution thereof.

BACKGROUND

In an image processing apparatus capable of performing image processing operations such as printing or scanning, various errors, such as paper jam, no paper, or lack of colorants, occur, which cause the image processing operation not to be carried out continuously. At the occurrence of the errors, as a solution thereof, for example, there is known a technique for notifying error information to an information processing apparatus utilizing the image processing apparatus.

For example, JP-A-2010-157929 describes a technique for notifying error information. According to the technique, in an image forming system including one digital multifunction peripheral and at least one host personal computer (PC) connected to the digital multifunction peripheral (MFP), if an error occurs in the digital multifunction peripheral, information for solving the error is sent to the host PC from the digital multifunction peripheral. The digital multifunction peripheral specifies an interface with the host PC, which is a destination, and sends an appropriate manual corresponding to the interface.

SUMMARY

However, the above-described technique has the following problem. That is, the error information may be unnecessary for the information processing apparatus which receives the error information. For example, for a user who does not intend to issue a print job, the error information on a print function, such as paper jam and lack of colorants, has a low utility value. In this instance, since the notification of the error may give confusion to the user, there is room for improvement.

Accordingly, an aspect of the present invention provides an error notification technique capable of appropriately notifying an error to each information processing apparatus which communicates with an image processing apparatus.

According to an illustrative embodiment of the present invention, there is provided a non-transitory computer-readable medium having a program stored thereon and readable by a processor of an information processing apparatus configured to communicate with an image processing apparatus, the program, when executed by the processor, causing the information processing apparatus to perform: acquiring error information indicating an error occurring in the image processing apparatus from the image processing apparatus and usage information of the image processing apparatus; determining whether to notify the acquired error information based on the acquired usage information; and notifying a user of the acquired error information if it is determined to notify the acquired error information.

According to the above configuration, it is determined whether to notify a user of the error information based on the usage information of the image processing apparatus. The image processing apparatus notifies the error information which is determined to be notified (in other words, the information process apparatus does not notify the error information which is not determined to be notified), and the notified error information is limited to the error information related to the image processing apparatus (or a user of the information processing apparatus). As a result, it can be expected to reduce the confusion of the user utilizing the information processing apparatus.

According to another illustrative embodiment of the present invention, there is provided an image processing apparatus comprising: a communication unit configured to communicate with an information processing apparatus; a processor; and memory storing computer-readable instructions, when executed by the processor, causing the image processing apparatus to perform: acquiring error information indicating an error occurring in the image processing apparatus and usage information of the image processing apparatus; determining whether to transmit, via the communication unit, the acquired error information to the information processing apparatus based on the acquired usage information; and transmitting the acquired error information to the information processing apparatus if it is determined to transmit the acquired error information.

According to a further illustrative embodiment, there is provided an image processing system including an image processing apparatus and an information processing apparatus which is configured to communicate with the image processing apparatus, the image processing system comprising: a processor; and memory storing computer-readable instructions, when executed by the processor, causing the image processing system to perform: acquiring error information indicating an error occurring in the image processing apparatus and usage information of the image processing apparatus; determining whether to notify the acquired error information based on the acquired usage information; and notifying a user of the acquired error information through the information processing apparatus if it is determined to notify the acquired error information.

According to a further illustrative embodiment, there is provided an image processing system including an image processing apparatus and an information processing apparatus which is configured to communicate with the image processing apparatus, the image processing system comprising: a processor; memory storing computer-readable instructions, when executed by the processor, causing the image processing system to perform: acquiring error information indicating an error occurring in the image processing apparatus and usage information of the image processing apparatus; notifying a user of the acquired error information in either one of a first mode and a second mode; and determining in which one of the first mode and the second mode, the notifying notifies the acquired error information, based on the acquired usage information.

According to a further illustrative embodiment, there is provided an error notifying method for an image processing system including an image processing apparatus and an information processing apparatus which is configured to communicate with the image processing apparatus, the error notifying method comprising: acquiring error information indicating an error occurring in the image processing apparatus and usage information of the image processing apparatus; determining whether to notify the acquired error information based on the acquired usage information; and notifying a user of the error information through the information processing apparatus if it is determined to notify the acquired error information.

According to the above configuration, the error notifying technique capable of reliably notifying the error to each information processing apparatus which is communicated with the image processing apparatus is realized.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Illustrative embodiments of an image processing system will be described in detail with reference to the accompanying drawings. The illustrative embodiments are directed to an image processing system including a multifunction peripheral (MFP) capable of executing image processing operations, such as printing, scanning, and transmission/reception of FAX, and a personal computer (PC) which communicates with the MFP.

Configuration of Image Processing System

Figure 1:
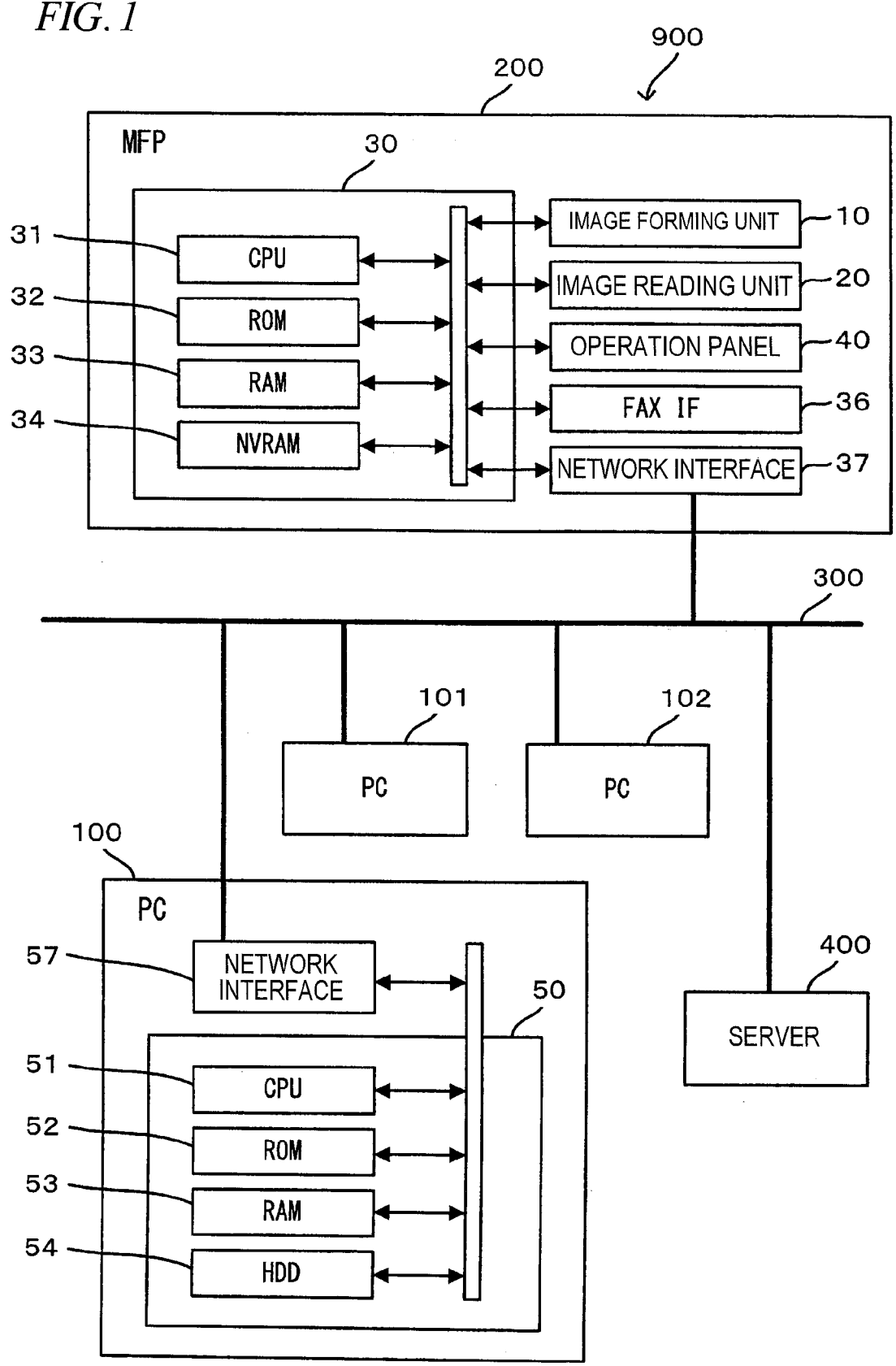
FIG. 1 is a block diagram illustrating an electrical configuration of a PC and an MFP according to an illustrative embodiment.

As shown in FIG. 1, an image processing system 900 of this illustrative embodiment includes PCs 100, 101 and 102, an MFP 200, and a server 400, and the respective devices can communicate with each other via a network 300. The number of the PCs and the MFP connected to the image processing system 900 is not limited thereto. Further, devices other than the PC, the MFP, and the server may be connected to the image processing system.

Configuration of PC

As shown in FIG. 1, the PC 100 (an example of an information processing apparatus) of this illustrative embodiment includes a control unit 50 having a CPU 51, a ROM 52, a RAM 53, and an HDD 54. Further, the control unit 50 is electrically connected to a network interface 57. The other PCs 101 and 102 and the server 400 have the same configuration.

The ROM 52 stores a program for various kinds of image processing operations, various settings, and initial values. The RAM 53 and the HDD 54 are used as a working area in which various programs are read, or a storage area for temporarily storing data.

The CPU 51 (an example of an error acquisition unit, a notification unit, a usage information acquisition unit, and a determination unit) stores the processed result in the RAM 53 or the HDD 54 in accordance with the program read from the ROM 52, and executes various processes.

The network interface 57 is an interface which is connected to the network 300 to enable it to communicate with other devices. The PC 100 receives a signal transmitted from another device via the network interface 57, and transmits the data to another device via the network interface 57.

Figure 2:
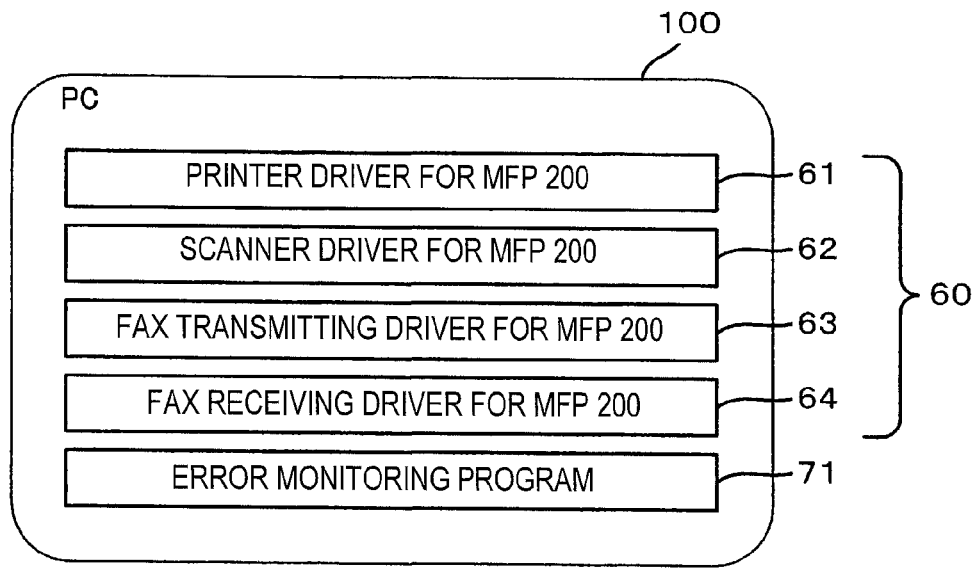
FIG. 2 is a diagram illustrating a program installed in the PC.

As shown in FIG. 2, the PC 100 is installed with a driver program 60 for controlling the MFP 200, and an error monitoring program 71 (an example of a program) for monitoring an error status of the device. The driver program 60 includes a printer driver 61, a scanner driver 62, a FAX transmitting driver 63, and a FAX receiving driver 64, for the MFP 200 in order to access various functions of the MFP 200. Addition, a device driver for controlling various devices may be installed in the PC 100.

The error monitoring program 71 is started at a timing to start the PC 100, and resides in a memory of the PC 100. The error monitoring program monitors an error occurring in the MFP 200 at a predetermined frequency, and if the error occurs, the error is notified, if necessary. A notification method includes, for example, a display of a message and an output of a warning sound. The detailed operation of the error monitoring program 71 will be described later.

Figure 3:
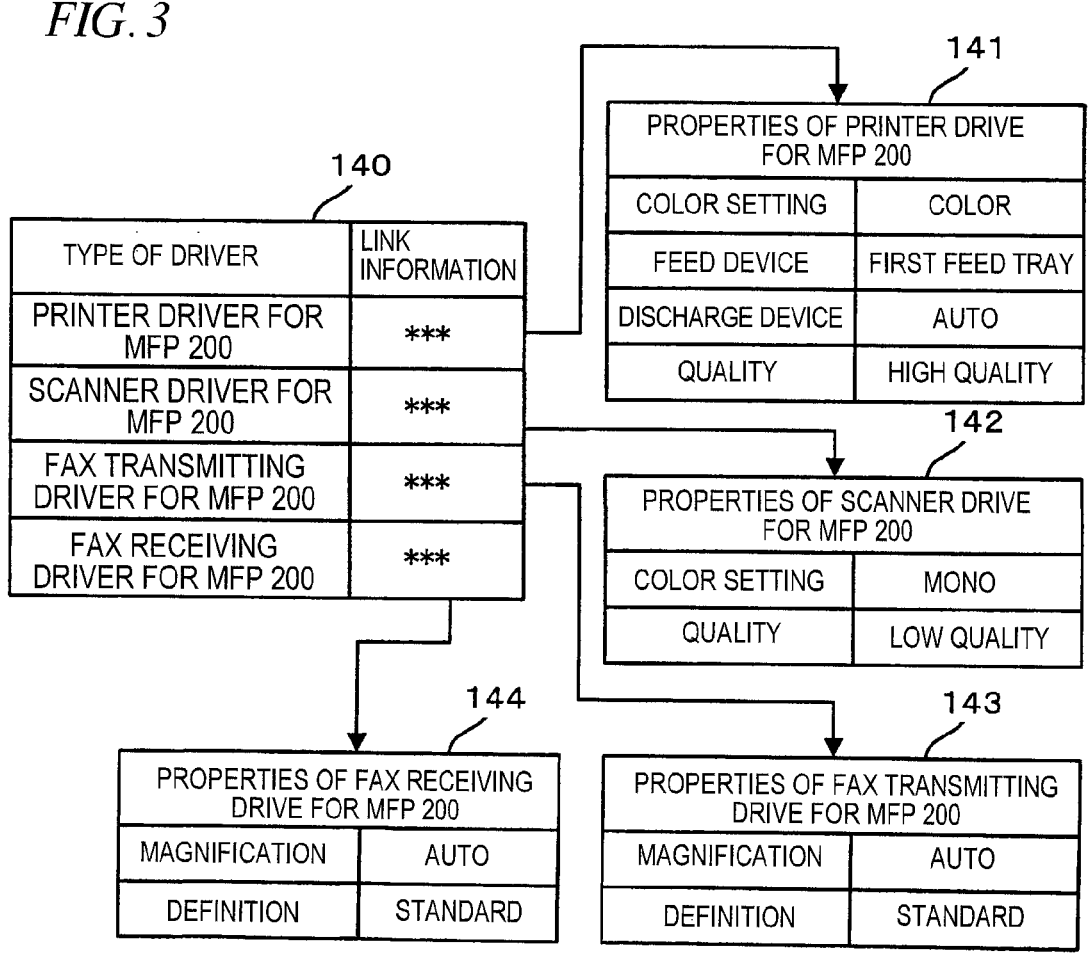
FIG. 3 is a diagram illustrating the configuration of a driver information database of the PC.

The HDD 54 stores a database (hereinafter, referred to as a driver information DB 140) which stores the information of the device driver installed in the PC 100, as shown in FIG. 3. Specifically, the driver information DB 140 stores a type of driver installed in the PC 100, and the information is updated when installing or uninstalling the driver.

Further, the HDD 54 has a database (hereinafter, referred to as a condition information DB) which stores the operating conditions of the image processing operation corresponding to the driver. For example, the PC 100 of this illustrative embodiment includes a condition information DB 141 for the printer driver 61, a condition information DB 142 for the scanner driver 62, a condition information DB 143 for the FAX transmitting driver 63, and a condition information DB 144 for the FAX receiving driver 64, since the printer driver 61 for the MFP 200, the scanner driver 62, the FAX transmitting driver 63, and the FAX receiving driver 64 are installed in the PC 100. The driver information DB 140 has link information to the condition information DB corresponding to each driver.

Configuration of MFP

As shown in FIG. 1, the MFP 200 (an example of the image processing apparatus) of this illustrative embodiment includes a control unit 30 having a CPU 31, a ROM 32, a RAM 33, and a non-volatile RAM (NVRAM) 34. The control unit 30 is electrically connected to the image forming unit 10 for printing an image on a sheet, the image reading unit 20 for reading the image of a document, an operation panel 40 for displaying the operation status or accepting an input operation by the user, a FAX interface 36, and a network interface 37.

The ROM 32 stores firmware which is a control program to control the MFP 200, or various settings, and the initial values. The RAM 33 and NVRAM 34 are used as a working area from which various control programs are read, or a storage area for temporarily storing data.

The CPU 31 (an example of an error acquisition unit, a usage information acquisition unit, and a determination unit) stores the processed result in the RAM 33 or the NVRAM 34 in accordance with the control program read from the ROM 32 or a signal sent from various sensors, and controls each constituent element of the MFP 200.

The FAX interface 36 is an interface which enables communication with other devices via a public line. The network interface 37 is an interface which enables communication with other devices via Internet. The MFP 200 receives the data transmitted from the external device via the FAX interface 36 or the network interface 37. Furthermore, the MFP 200 transmits the data to the external device via the FAX interface 36 or the network interface 37.

The operation panel 40 has various buttons for accepting user input, and a touch panel screen which displays character information, buttons or the like. Examples of various types of buttons include an OK button for instructing a start of the image processing operation, or a cancel button for instructing a cancellation of the image processing operation.

Figures 4, 5, 6:
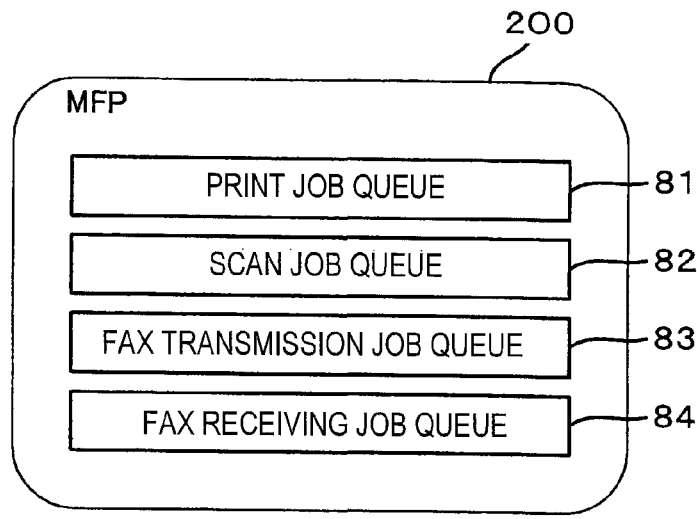
FIG. 4 is a diagram illustrating a list of queues of the MFP.
FIG. 5 is a diagram illustrating the configuration of a status information database of the MFP.
FIG. 6 is a diagram illustrating the configuration of a usage restriction information database of the MFP.

The MFP 200 has a job queue to register a job received for each image processing operation. Specifically, the MFP 200 has a printing function, a scanning function, a FAX transmission function, a FAX receiving function. As shown in FIG. 4, the MFP 200 has a print job queue 81 for registering a print job, a scan job queue 82 for registering a scan job, a FAX transmission job queue 83 for registering a FAX transmission job, and a FAX receiving job queue 84 for registering a FAX receiving job.

Upon receiving the print job, for example, the MFP 200 registers the information of the print job in the print job queue 81. The MFP 200 processes the print jobs registered in the print job queue 81 in the order of registration thereof, and if the processing of the print job is completed, deletes the registration of the print job from the print job queue 81. The information registered in the print job queue 81 contains basic information such as identification information of the job, user information of the job information (or device information of a source of the job), registration date, and data size. The scan job queue 82, the FAX transmitting job queue 83, and the FAX receiving job queue 84 have the same configuration as that of the print job queue 81.

The MFP 200 has a database (hereinafter, referred to as a status information DB 240) for storing status information, as shown in FIG. 5, and a database (hereinafter, referred to as a user restriction information DB 241) for storing user restriction information for each image processing operation of the device itself for each user using the image processing system 900, as shown in FIG. 6.

Specifically, the status information DB 240 stores a current status for each image processing operation. Whenever the status of each image processing operation is changed, the information of the status information DB 240 is updated.

As the contents of the status, if no error occurs, no error status is stored. On the other hand, if any error occurs, the contents of the error are stored. In FIG. 5, the contents of the status are described, but, actually, a code indicating the contents is stored. In addition, when plural errors occur in one image processing operation, all error codes for respective errors is stored in the status information DB 240.

The usage restriction information DB 241 stores information about usage availability to each image processing operation for respective users. Specifically, the usage restriction performed by the MFP 200 of this illustrative embodiment includes usage prohibition which prohibits the usage itself of the image processing operation, and the limited number of times which prohibits the usage by setting the remaining number of times which is the remaining number of times available for the image processing operation, and counting the remaining number of times at every usage to prohibit the usage if the remaining number of times is 0. For the limited number of times, if a predetermined period (e.g., 24 hours) has elapsed, the remaining number of times is reset to the initial value. Even if the remaining number of times is zero, the user can use the image processing operation after a predetermined period elapses or a manager resets the limited number of times. The MFP 200 of this illustrative embodiment restricts the usage by the limited number of times for the printing and scanning, and restricts the usage by usage prohibition for the FAX transmission. The FAX reception is not a subject of usage restriction.

The usage restriction information DB 241 stores the number remaining for the printing and the scanning. Therefore, 0 means that the usage is prohibited. On the other hand, for the FAX function, YES is stored if the usage is allowed, whereas NO is stored if the usage is prohibited. The usage restriction of the image processing operation is not limited to the example of this illustrative embodiment, and the usage restriction may be performed by the usage prohibition for the printing and the scanning, or the usage restriction may be performed by the limited number of times for the FAX function.

Operation of Image Processing System

Then, the operation of the image processing system to notify the PC 100 of the error occurring in the MFP 200 will be described separately in six illustrative embodiments.

Each illustrative embodiment is different in that the display of the error on the PC 100 is determined by the PC 100 or the MFP 200. Further, each illustrative embodiment is different in that the usage information of the MFP 200 which is used for the determination of the error display is the usage information of the MFP 200 contained in the PC 100, or own usage information of the MFP 200. Specifically, the difference in four illustrative embodiments is as follows:

First illustrative embodiment: The PC 100 makes determination based on the usage information of the PC 100.

Second illustrative embodiment: The PC 100 makes determination based on the usage information of the MFP 200.

Third illustrative embodiment: The MFP 200 makes determination based on the usage information of the MFP 200.

Fourth illustrative embodiment: The MFP 200 makes determination based on the usage information of the PC 100.

In addition to the usage status such as registration status of a job or installation status of a device driver, the usage information which becomes determination material of the error display includes the usage restriction which limits the usage of the MFP 200 for respective users. Therefore, it will be described the following illustrative embodiment in which whether to perform the error display is determined based on the usage restriction.

Fifth illustrative embodiment: The PC 100 makes determination based on the usage information (including usage restriction) of the MFP 200.

Sixth illustrative embodiment: The MFP 200 makes determination based on the usage information (including usage restriction) of the MFP 200.

[First Illustrative Embodiment]

Figure 7:
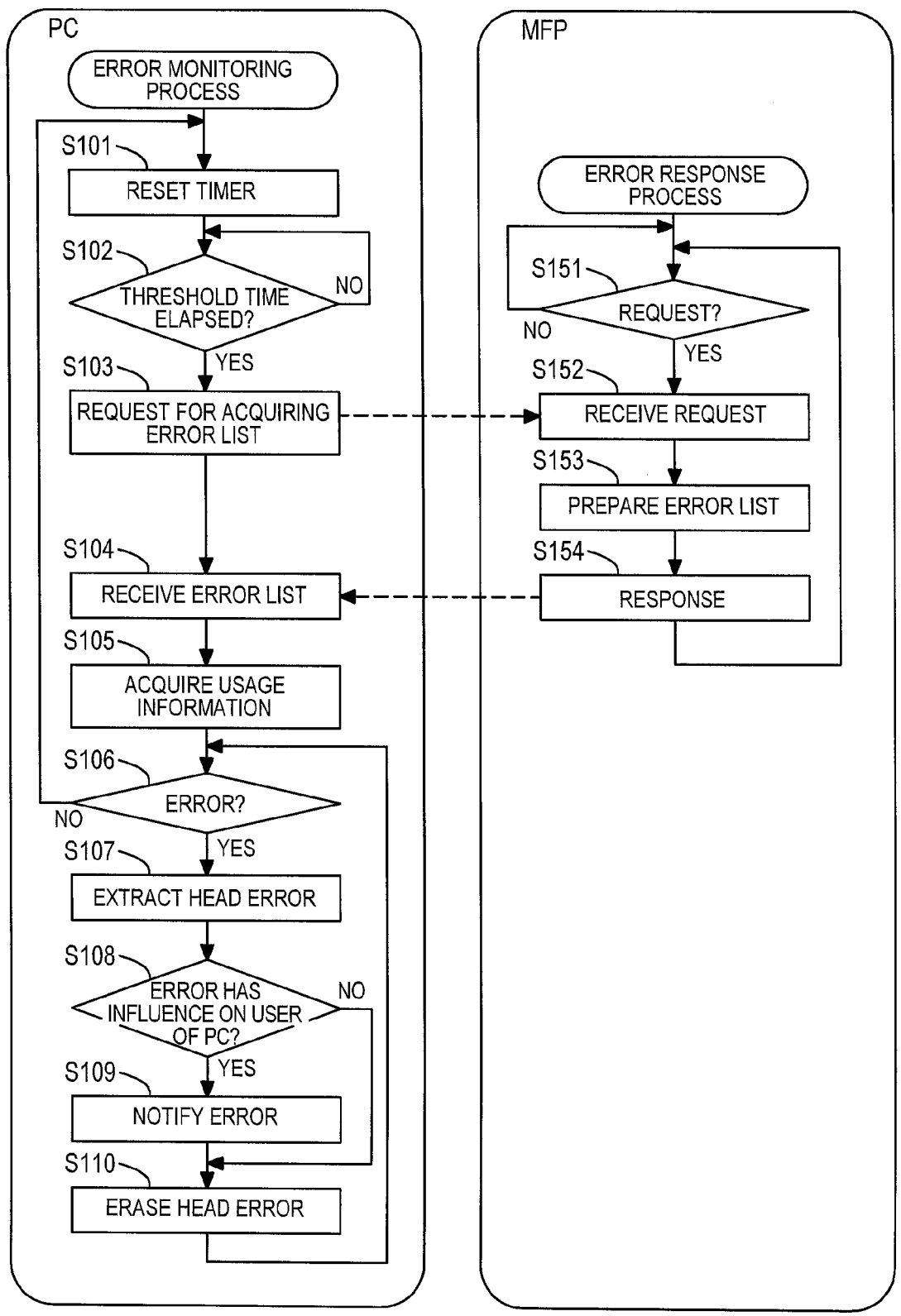
FIG. 7 is a flowchart illustrating an operation procedure of the PC and the MFP according to a first illustrative embodiment.

First, the operation of the image processing system of the first illustrative embodiment will be described with reference to the flowchart of FIG. 7. FIG. 7 describes two processes, that is, an error monitoring process executed by the PC 100 and an error response process executed by the MFP 200. The error monitoring process is a process executed by a monitoring program 71 of the PC 100, and is carried out by the CPU 51, in response to the start of the PC 100. The error response process is a process executed by the control program installed in the MFP 200, and is carried out by the CPU 31, in response to the start of the MFP 200.

The error monitoring process of the PC 100 will be described. In the error monitoring process of the first illustrative embodiment, first, a timer is reset, and the timer is restarted (S101). Then, it is determined whether the measured time of the timer has passed a threshold time (S102). If the measured time have not passed the threshold (NO in S102), the PC waits until the threshold time elapses.

If the measured time has passed the threshold time (YES in S102), the PC 100 outputs a request for acquiring an error list to the MFP 200 (S103), that is, the PC 100 outputs the request for acquiring the error list at a frequency of a threshold time interval. After the output in S103, the PC waits until it receives a response from the MFP 200.

After started, in the error response process of the MFP 200, it is determined whether there is the request for acquiring the error list (S151). If there is no request for acquiring the error list (NO in S151), the PC waits until it receives the request for acquiring the error list. It is noted that the request for acquiring the error list is not limited to the PC 100, and may be output from other PCs 101 and 102.

If there is the request for acquiring the error list (YES in S151), the PC receives the acquisition request (S152), and prepares the error list with reference to the status information DB 240 (S153). Specifically, in 5153, the error code of the error which is occurring is acquired by reading the status from the status information DB 240, except for the no-error status, and prepares the error list storing the error code. This error list does not distinguish the image processing operations, and registers all errors which are occurring in the MFP 200. Therefore, for example, if an error occurs in the plurality of image processing operations, the plurality of errors are registered in the error list.

After S153, the prepared error list is transmitted to the information processing apparatus (PC 100 in this illustrative embodiment) which makes the acquisition request. That is, it responds to the request for acquiring the error list (S154). The error list is created even when no error occurs. In this case, an empty error list which is not registered with the error is transmitted. After S154, the process proceeds to S151, and the PC waits until it receives the request for acquiring the following error list.

Returning to the description of the error monitoring process of the PC 100, the error list prepared by the MFP 200 is received as the response from the MFP 200 (S104; an example of an error acquisition unit). Accordingly, the PC 100 acquires the information of all errors which occurs in the MFP 200.

In addition to the error list, the PC 100 acquires the usage information of the MFP 200 which is stored in the PC 100 itself (S105; an example of a usage information acquisition unit). The usage information acquired in S105 is information indicating the usage status of each image processing operation of the MFP 200, and also is information which is an element for determining whether the error is to be notified in S108 which will be described later. For example, the usage information may include the installation status of the device drivers for the MFP 200, the setting status of the operating conditions of each image processing operation, or the transmission and reception status of the job. The timing of acquiring the usage information is not limited to the timing of receiving the error list, and is available at any time before it is determined whether the error is to be notified in S108 which will be described later, after the threshold time of S102 has elapsed.

Next, it is determined whether an error is registered in the error list acquired (S106). If an error is registered (YES in S106), the error registered at a head of the error list is extracted (S107).

After the error is extracted in S107, it is determined whether the error has an influence on the user based on the usage information acquired in S105 and the usage information of the user using the PC 100 (S108; an example of a determination unit).

For example, if it is determined by the status of the installation of the device driver, the installation of the device driver is acquired with reference to the driver information DB 140 in S105. For example, if the error is determined as an error for printing (e.g., no paper, paper jam, lack of colorants), it is determined that the error has an influence on the user when the printer driver for the MFP 200 is installed. When the printer driver is not installed, it is determined that the error has no effect. Similarly, if the error is an error related to the scan (e.g., ADF paper jam), it can be determined whether the error has an influence on the user, based on the installation status of the scan driver for MFP 200. Also, if the error is an error related to FAX transmission or FAX reception (e.g., telephone line disconnected), it can be determined whether the error has an influence on the user, based on the FAX transmission driver or FAX reception driver.

In S108, for example, the presence or absence of the influence can be determined by the setting status of the operating conditions of each image processing. In this case, the operating conditions for each image processing are acquired with reference to the condition information DB corresponding to the device driver of each image processing in S105. For example, among the errors related to the printer, if the error is related to the lack of toner other than black, and the color is set in the color setting among the operating conditions of the printer driver, it is determined that the error has an influence on the user. If monochrome is set in the color setting, or if there is no condition information DB 141 of the printer driver (i.e., the printer driver is not installed), it is determined that there is no effect. Further, among the errors related to the print, if there is no paper in a first paper feed tray, and the first paper feed tray is set as a paper feed device among the operating conditions of the printer driver, it is determined that the error has an influence on the user. If it is determined that another paper feed tray other than the first paper feed tray is set as the paper feed device or if there is no condition information DB 141 of the printer driver, there is no effect.

In S108, the presence or absence of the influence can be determined by the presence of jobs being transmitted or received between the PC 100 and the MFP 200. In this case, the information about the jobs being transmitted or received between the PC 100 and the MFP 200 is acquired for each image process in S105. For example, if the transmission of the image data is not complete in the print job or the FAX transmission/reception job, it can be determined as 'being transmitted'. Further, if the reception of the image data is not completed in the print job or the FAX transmission/reception job, it can be determined as 'being receiving'. For example, if the transmission of the print data is not completed, it is determined that the error related to the printing has an effect. Further, for example, if the reception is not completed, it is determined that the error related to the scanning has an effect.

In addition, in 5108, the above-described determination examples (the installation status of the device driver, the operating conditions of the image processing, and the presence of transmitting or receiving job) can be combined in plural. For example, both the installation status of the device driver and the operating conditions of the image process are determined, and if it is determined that it is affected by at least one, it may be determined that the error has an effect.

In S108, if it is determined the error has an influence (YES in S108), the error extracted in S107 is notified to the user (S109; an example of a notification unit). On the other hand, if it is determined that the error has no influence (NO in S108), S109 is skipped, and thus the error is not notified. That is, if it is determined that the error registered in the error list does not affect on the user using the PC 100, the PC 100 does not notify the error.

After notifying the error in S109, if it is determined that the error has no influence (NO in S108), the error extracted in S107 is erased from the error list (S110). Then, the process proceeds to S106, and if there is still an error in the error list (YES in S106), the processes after S107 are carried out for the error. On the other hand, if there is no error (NO in S106), the process proceeds to S101 to reset the timer, and the PC waits until the time again measured by the timer passes the threshold time.

In the first illustrative embodiment described above, the PC 100 acquires the usage information of the MFP 200 stored in the PC 100, and, based on the usage information, it is determined whether the error acquired from the MFP 200 has an influence on the user utilizing the PC 100. For the error having no effect, it is determined that the error is not notified to the user. Accordingly, the error to be notified is limited to the errors which affect the user utilizing the PC 100, so that it can be expected to reduce the confusion of the user utilizing the PC 100. Further, in the configuration of the first illustrative embodiment, since the information of the PC 100 is acquired as the usage information, it is not necessary to inquire the MFP 200 for the usage information. For this reason, it is possible to avoid a load from being concentrated on the MFP 200.

[Second Illustrative Embodiment]

Figure 8:
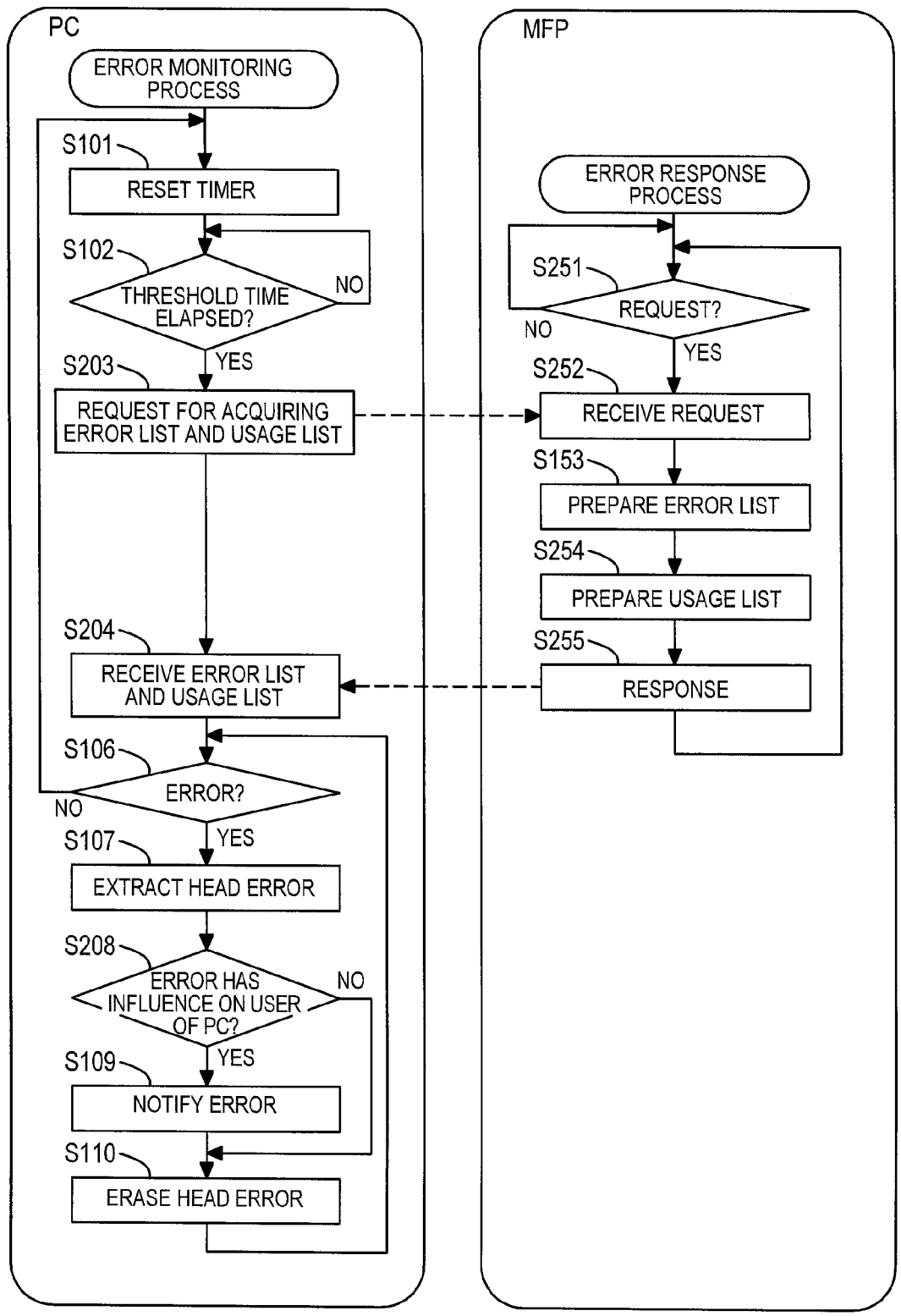
FIG. 8 is a flowchart illustrating an operation procedure of the PC and the MFP according to a second illustrative embodiment.

Next, the operation of the image processing system according to the second illustrative embodiment will be described with reference to the flowchart of FIG. 8. In the second illustrative embodiment, the usage information of the MFP 200 is acquired from the information stored in the MFP 200. This is different from the first illustrative embodiment in which the usage information of the MFP 200 is acquired from the information stored in the PC 100. The flowchart of FIG. 8 illustrates two processes, that is, the error monitoring process executed by the PC 100 and the error response process executed by the MFP 200, similar to FIG. 7. The same processes as those of the first illustrative embodiment are denoted by the same reference numerals, and its description will be simplified.

In the error monitoring process of the second example, first, the timer is reset, and the timer is restarted (S101). After that, the PC 100 waits until the measured time of the timer passes a threshold time (S102).

If the time has passed the threshold time (YES in S102), the PC outputs a request for acquiring the error list and a usage list to the MFP 200 (S203). After the output in S203, the PC 100 waits until it receives a response from the MFP 200.

After started, in the error response process of the MFP 200, it is determined whether there is the request for acquiring the error list and the usage list (S251). If there is no request for acquiring the error list and the usage list (NO in S251), the PC waits until it receives the request for acquiring the error list and the usage list.

If there is the request for acquiring the error list and the usage list (YES in S251), the MFP 200 receives the acquisition request (S252), and prepares the error list with reference to the status information DB (S153).

The usage list is prepared with reference to job queues 81, 82, 83 and 84 of each image processing operation (S254). More specifically, in 5254, the information of all jobs currently registered in the job queues 81, 82, 83 and 84 of each image processing operation is registered in the usage list. At this time, without distinguishing the PC or user names, all the jobs currently registered in the MFP 200 is registered in the usage list. S254 may be carried out in a reverse order.

After S254, the prepared error list and usage list is transmitted to the information processing apparatus requesting for the acquisition. That is, the MFP 200 responses to the request for acquiring the error list and the usage list (S255). The usage list is prepared even if one job is not registered. In this case, an empty usage list in which no job is registered is sent. This is similar to the error list. After S255, the process proceeds to S251, and the MFP 200 waits until it receives the request for acquiring the error list and the usage list.

Returning to the description of the error monitoring process of the PC 100, the error list and the usage list prepared by the MFP 200 are received as the response from the MFP 200 (S204; an example of an error acquisition unit and a usage information acquisition unit). Then, it is determined whether an error exits in the error list acquired (S106). If there is the error (YES in S106), the error registered in the head of the error list is extracted (S107).

After extracting the error in S107, based on the usage list acquired from the MFP 200, it is determined whether the error has an influence on the user utilizing the PC 100 (S208; an example of a determination unit). For example, in S208, if the error is an error related to the print, it is determined that the error has an influence in the case where the print job of the user utilizing the PC 100 exists in the usage list. In the case where the print job of the user utilizing the PC 100 does not exist in the usage list, it is determined that the error has no effect. Similarly, in S208, if the error is an error related to the scanning, it can be determined that the error has an effect, based the presence or absence of the scanning operation. Also, if the error is an error related to FAX transmission, it can be determined whether the error has an effect, based on the presence or absence of the FAX transmitting operation. Also, if the error is an error related to FAX reception, it can be determined whether the error has an effect, based on the presence or absence of FAX receiving operation.

It can be determined whether the job registered in the usage list is the job of the user utilizing the PC 100, for example, by the fact in which the usage information contained in the information of each job matches with the information of user logging in the PC 100.

If it is determined in S208 that the error has an influence (YES in S208), the extracted error is notified to the user (S109; an example of a notification unit). On the other hand, if it is determined that the error has no influence (NO in S208), S109 is skipped, and the error is not notified.

After notifying the error (S109), if it is determined in S208 that the error has no influence (NO in S208), the error extracted in S107 is erased from the error list (S110), and the process proceeds to S106.

According to the second illustrative embodiment described above, the PC 100 acquires the usage list which is the information of the job currently registered in the MFP 200 as the usage information, and determines whether the error acquired from the MFP 200 has an influence on the user utilizing the PC 100, based on the usage list. For the error having no effect, it is determined that the error is not notified to the user. In this way, similar to the first illustrative embodiment, the error to be notified is limited to the errors that affect the user utilizing the PC 100, so that it can be expected to reduce the confusion of the user utilizing the PC 100. Further, in the configuration of the second illustrative embodiment, since the information of the job which is actually contained in is used, it is possible to expect that it is accurately determined whether the error having an influence on the user is notified or not.

[Third Illustrative Embodiment]

Figure 9:
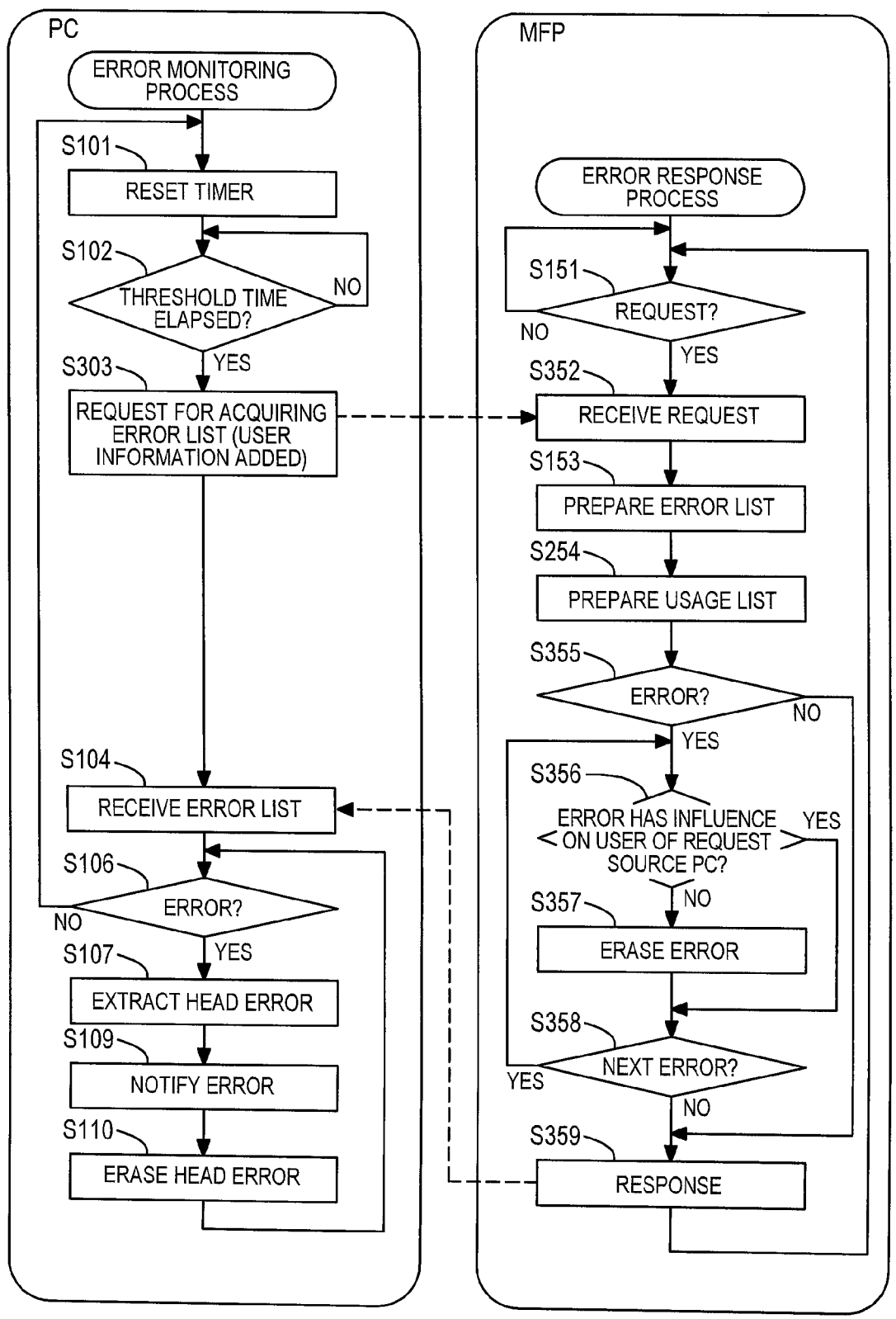
FIG. 9 is a flowchart illustrating an operation procedure of the PC and the MFP according to a third illustrative embodiment.

Next, the operation of the image processing system of the fourth illustrative embodiment will be described with reference to the flowchart of FIG. 9. In the third illustrative embodiment, the usage information of the MFP 200 is acquired from the information stored in the MFP 200, and then it is determined whether the MFP 200 notifies the PC 100 of the error. This is different from the first illustrative embodiment in which the usage information of the MFP 200 is acquired from the information stored in the PC 100 and it is determined whether the error is notified to the PC 100 itself. FIG. 9 illustrates two processes, that is, the error monitoring process executed by the PC 100 and the error response process executed by the MFP 200. The same processes as those of the first and second illustrative embodiments are denoted by the same reference numerals, and its description will be simplified.

In the error monitoring process of the third illustrative embodiment, first, the timer is reset, and the timer is restarted (S101). After that, the PC 100 waits until the measured time of the timer passes a threshold time (S102).

If the time has passed the threshold time (YES in S102), the PC 100 outputs a request for acquiring the error list and the usage list to the MFP 200 (S303). In this illustrative embodiment, the information about the user using the PC 100 is added to the acquisition request. After the output in S303, the PC 100 waits until it receives a response from the MFP 200.

After started, in the error response process of the MFP 200, it is determined whether there is the request for acquiring the error list (S151). If there is not request for acquiring the error list (NO in S151), the MFP 200 waits until it receives the request for acquiring the error list.

If there is the request for acquiring the error list (YES in S151), the MFP 200 receives the acquisition request (S152). In S152, the user information added to the acquisition request is also received. After that, the PC 100 prepares the error list with reference to the status information DB 240 (S153; an example of the error information acquisition unit). Then, the usage list is prepared with reference to the job queues 81, 82, 83 and 84 of each image processing operation (S254; an example of the usage information acquisition unit). S254 may be carried out in a reverse order.

Next, it is determined whether an error exists in the error list prepared (S355). If there is an error (YES in S355), it is determined whether the error which is registered in the head of the error list has an influence on the user of the information processing apparatus (hereinafter, referred to as a request source PC) outputting the request for acquiring the error list based on the usage list and the usage information (S356; an example of the determination unit).

For example, if the error is an error related to the print in S356, it is determined the error has an influence in the case where the print job of the user utilizing the request source PC exists in the usage list. It is determined the error has no influence in the case where the print job of the user utilizing the request source PC does not exist in the usage list. Similarly, if the error is an error related to the scanning, it can be determined that the error has an effect, based the presence or absence of the scanning operation. Also, if the error is an error related to FAX transmission, it can be determined whether the error has an effect, based on the presence or absence of the FAX transmitting operation. Also, if the error is an error related to FAX reception, it can be determined whether the error has an effect, based on the presence or absence of FAX receiving operation. In addition, the MFP 200 distinguishes the user using the request source PC based on the user information added to the request for acquiring the error list by the request source PC.

In S356, if it is determined that the error has no influence (NO in S356), the error which is an object to be determined in S356 is erased from the error list (S356). On the other hand, if it is determined that the error has an influence (YES in S356), S357 is skipped, and the error information is left in the error list.

After the error is erased in S357, or if it is determined in S356 that the error has an influence (YES in S356), it is determined whether there is a next error (S358). If there is the next error (YES in S358), the next error is selected, and then the process proceeds to S356.

On the other hand, if there is no error (NO in S355), or if there is no next error (NO in S358), the error list is transmitted to the request source PC. That is, MFP 200 responses to the request for acquiring the error list (S359). The error list transmitted in S359 is an error list from which the error, which is determined that the error has no influence on the user of the request source PC, is erased. This is different from S154 of the first illustrative embodiment which transmits the error list having all errors.

Returning to the description of the error monitoring process of the PC 100, the error list prepared by the MFP 200 is received as the response from the MFP 200 (S104). Then, it is determined whether an error exists in the error list acquired (S106). If there is the error (YES in S106), the error registered in the head is extracted (S107).

After S107, the extracted error is notified to the user (S109; an example of a notification unit). After S109, the notified error is erased from the error list (S110), and the process proceeds to S106. In the third illustrative embodiment, since the error having no influence on the user of the request source PC, that is, the user of the PC 100, is erased from the error list by the MFP 200, all error registered in the error list received from the MFP 200 becomes an object to be notified.

According to the third illustrative embodiment described above, the MFP 200 acquires the usage list which is the information of the user utilizing the request source PC and the usage information of the apparatus itself, and determines whether the currently occurring error has an influence on the user utilizing the request source PC, based on the usage list. If it is determined that the error has no effect, the error is not notified to the request source PC. That is, it is determined that the error is not notified to the request source PC. In this way, similar to the first illustrative embodiment, the error to be notified is limited to the errors which affect the user utilizing the PC 100, so that it can be expected to reduce the confusion of the user utilizing the PC 100. Further, in the configuration of the third illustrative embodiment, since it is determined that each error is notified to the PC 100, based on the usage information of the apparatus itself provided in the MFP 200, and the PC is not necessary to execute the determination process of the notification, it is possible to prevent the load from being focused on the PC 100.

[Fourth Illustrative Embodiment]

Figure 10:
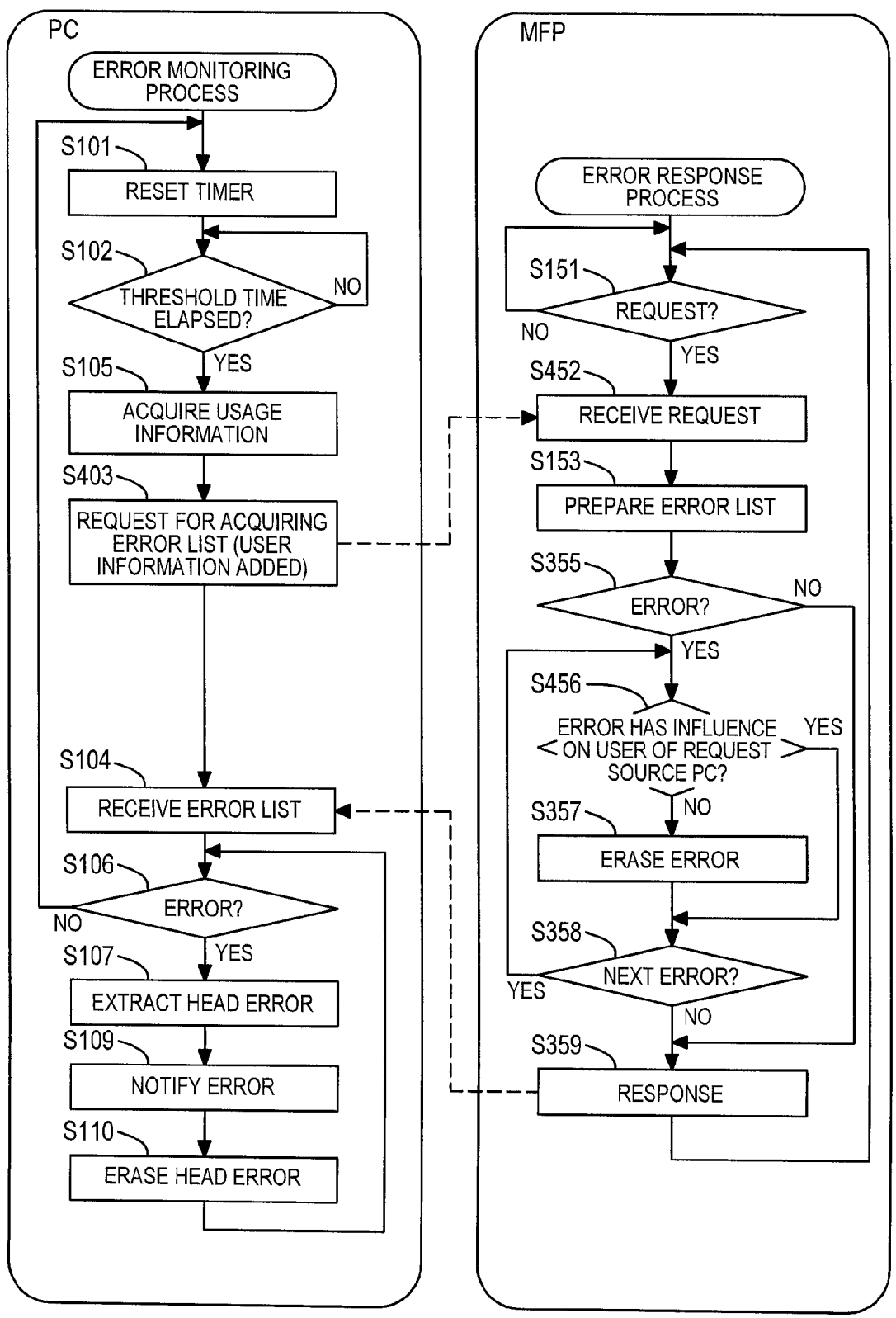
FIG. 10 is a flowchart illustrating an operation procedure of the PC and the MFP according to a fourth illustrative embodiment.

Next, the operation of the image processing system of the fourth illustrative embodiment will be described with reference to the flowchart of FIG. 10. In the fourth illustrative embodiment, the MFP 200 acquires the usage information of the MFP 200 which is stored in the PC 100, and determines whether the error is notified to the PC 100. This is different from the first illustrative embodiment in which the PC 100 itself determines whether the error is notified or not, based on the usage information of the MFP 200 stored in the PC 100. The flowchart of FIG. 10 illustrates two processes, that is, the error monitoring process executed by the PC 100 and the error response process executed by the MFP 200, as illustrated in FIG. 7 or the like. The same processes as those of the first to third illustrative embodiments are denoted by the same reference numerals, and its description will be simplified.

First, a timer is rest, and the timer is restarted (S101). After that, it is determined whether the measured time of the timer has passed a threshold time (S102). If the measured time has not passed the threshold (NO in S102), the PC 100 waits until the threshold time elapses.

If the measured time has passed the threshold time (YES in S102), the PC 100 acquires the usage information of the MFP 200 stored in the PC 100 itself (S105). The usage information is information which is a factor for determining whether the error is notified, and is same as usage information (installation statuses of device drivers, and operating conditions of each device driver) acquired in S105 of the first illustrative embodiment.

After S105, the PC outputs a request for acquiring the error list to the MFP 200 (S403). The usage information acquired in S105 is added to the acquisition request. After the output in S403, the PC 100 waits until it receives a response from the MFP 200.

After started, in the error response process of the MFP 200, it is determined whether there is the request for acquiring the error list (S151). If there is not request for acquiring the error list (NO in S151), the MFP 200 waits until it receives the request for acquiring the error list.

If there is the request for acquiring the error list (YES in S151), the MFP 200 receives the acquisition request (S452; an example of a usage information acquisition unit). In S452, since the user information is added to the request source PC, the usage information is also acquired. After that, the MFP 200 prepares the error list with reference to the status information DB 240 (S153; an example of the error acquisition unit).

Next, it is determined whether an error exists in the error list prepared (S355). If there is the error (YES in S355), it is determined whether the error which is registered in the head of the error list has an influence on the user utilizing the request source PC, based on the usage information received from the request source PC in S452 (S456; an example of the determination unit).

For example, if the error is an error related to the print in S456, it is determined the error has an influence in the case where the printer driver is installed in the request source PC. It is determined the error has no influence in the case where the printer driver is not installed in the request source PC. Similarly, if the error is an error related to the scanning, it can be determined that the error has an effect, based on the presence or absence of the scanner driver. Also, if the error is an error related to FAX transmission, it can be determined whether the error has an effect, based on the presence or absence of the FAX transmission driver. Also, if the error is an error related to FAX reception, it can be determined whether the error has an effect, based on the presence or absence of FAX reception driver.

In S456, for example, it can be determined whether the error has an effect, based on the setting contents of the operating conditions of each driver. For example, among the errors related to the printer, if the error is related to the lack of the toner other than black, and the color is set in the color setting among the operating conditions of the printer driver, it is determined that the error has an influence on the user. If monochrome is set in the color setting, or if there is no operation condition of the printer driver (i.e., the printer driver is not installed), it is determined that there is no effect. Further, among the errors related to the print, if there is no paper in a first paper feed tray, and the first paper feed tray is set as a paper feed device among the operating conditions of the printer driver, it is determined that the error has an influence on the user. If it is determined that another paper feed tray other than the first paper feed tray is set as the paper feed device or if there is no operation condition of the printer driver, there is no influence.

In S456, it is determined that the error has no influence (NO in S456), the error which is the object to be determined in S456 is erased from the error list (S357). On the other hand, in S456, if it is determined that the error has an influence (YES in S456), S357 is skipped, and the error information is left in the error list (YES in S456).

After the error is erased in S357, or if it is determined in S456 that the error has an influence (YES in S456), it is determined whether there is a next error (S358). If there is the next error (YES in S358), the next error is selected, and then it proceeds to S456. If there is no error (NO in S355) or there is no next error (NO in S358), the error list is transmitted to the request source PC. That is, it responses to the request for acquiring the error list (S359).

Returning to the description of the error monitoring process of the PC 100, the error list prepared by the MFP 200 is received as the response from the MFP 200 (S104). Then, it is determined whether an error exists in the error list acquired (S106). If there is the error (YES in S106), the error registered in the head is extracted (S107). After S107, the extracted error is notified to the user (S109; an example of a notification unit). After S109, the notified error is erased from the error list (S110), and the process proceeds to S106.

According to the fourth illustrative embodiment described above, the MFP 200 acquires the usage information of the MFP 200 from the PC, and determines whether the currently occurring error has an influence on the user utilizing the request source PC, based on the usage information. If it is determined that the error has no effect, the error is not notified to the request source PC. That is, it is determined that the error is not notified to the request source PC. In this way, similar to the first illustrative embodiment, the error to be notified is limited to the errors which affect the user utilizing the PC 100, so that it can be expected to reduce the confusion of the user utilizing the PC 100. Further, in the configuration of the fourth illustrative embodiment, since the information contained in the PC 100 is used, it is possible to more accurately determine whether the errors having the influence on the user are notified or not.

[Fifth Illustrative Embodiment]

Figure 11:
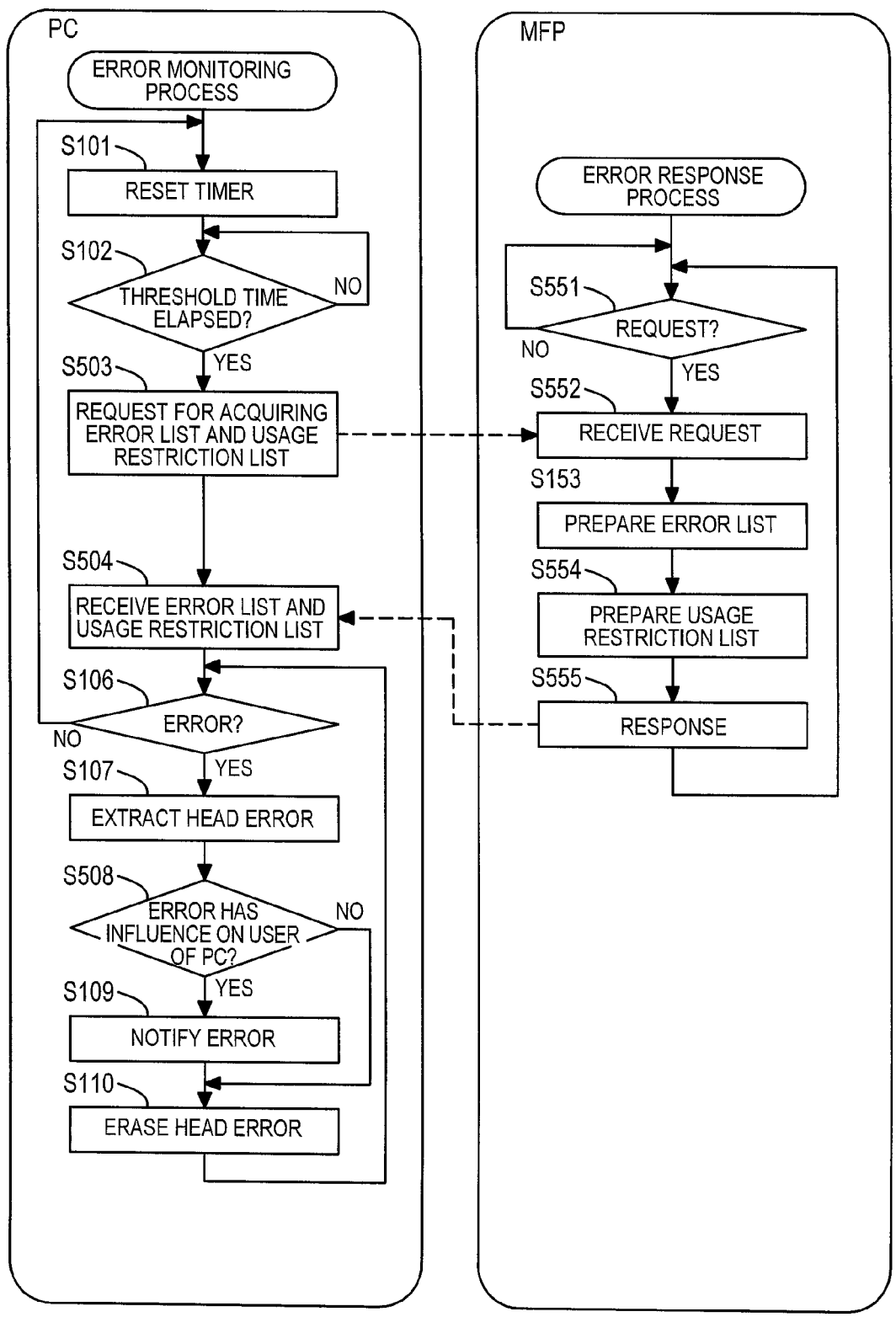
FIG. 11 is a flowchart illustrating an operation procedure of the PC and the MFP according to a fifth illustrative embodiment.

Next, the operation of the image processing system of the fifth illustrative embodiment will be described with reference to the flowchart of FIG. 11. The fifth illustrative embodiment is another embodiment of the second illustrative embodiment, in which the PC 100 acquires the usage information from the MFP 200, and then it is determined whether the PC 100 notifies the error. In the fifth illustrative embodiment, the information about the usage restriction is the usage information. FIG. 11 illustrates two processes, that is, the error monitoring process executed by the PC 100 and the error response process executed by the MFP 200, as illustrated in FIG. 7 or the like. The same processes as those of the second example are denoted by the same reference numerals, and its description will be simplified.

In the error monitoring process of the fifth illustrative embodiment, first, the timer is reset, and the timer is restarted (S101). After that, the PC 100 waits until the measured time of the timer passes a threshold time (S102).

If the time has passed the threshold time (YES in S102), the PC 100 outputs a request for acquiring the usage restriction list and the error list to the MFP 200 (S503). After the output in S503, the PC 100 waits until it receives a response from the MFP 200.

After started, in the error response process of the MFP 200, it is determined whether there is the request for acquiring the usage restriction list and the error list (S551). If there is no request for acquiring the usage restriction list and the error list (NO in S551), the MFP 200 waits until the request for acquiring the usage restriction list and the error list is received.

If there is the request for acquiring the usage restriction list and the error list (YES in S551), the acquisition request is received (S552), and then the error list is prepared with reference to the status information DB 240 (S153).

In addition, the usage restriction list is prepared with reference to the usage restriction information DB 241 (S554). Without distinguishing the PC or user names, the usage restriction list registering the usage restriction of all users is prepared. Also, in the case where the information specifying the user is added to the acquisition request received in S552, only the usage restriction information of the user may be extracted. S153 and S554 may be carried out in a reverse order.

After S554, the error list and the usage restriction list prepared are transmitted to the information processing apparatus requesting the acquisition. That is, the MFP 200 responses to the request for acquiring the error list and the usage restriction list (S555). After S555, the process proceeds to S551, and the MFP 200 waits until the request for acquiring the error list and the usage restriction list is received.

Returning to the description of the error monitoring process of the PC 100, the error list and the usage restriction list prepared by the MFP 200 are received as the response from the MFP 200 (S504; an example of an error acquisition unit and a usage information acquisition unit). Then, it is determined whether an error exits in the error list acquired (S106). If there is the error (YES in S106), the error registered in the head of the error list is extracted (S107).

After extracting the error in S107, based on the usage restriction list acquired from the MFP 200, it is determined whether the error has an influence on the user utilizing the PC 100 (S508; an example of a determination unit). More specifically, the usage restriction information of the use utilizing the PC 100 is acquired based on the usage restriction list, and if the error extracted in S107 is an error related to the image processing operation whose usage is restricted, it is determined that the error has no effect. If the error is an error related to the image processing operation whose usage is not restricted, it is determined that the error has an effect. Similarly, for the user who is restricted from using scanning, it can be determined that the error related to the scanning has no effect. Also, for the user who is restricted from using the FAX, it can be determined that the error related to the FAX has no effect.

In addition, in the determination in S508, if the usage is restricted since the remaining number of times is 0, the presence or absence of the influence may be determined by a length of the time until the remaining number of times is reset. In other words, if the time until the remaining number of times is reset is shorter than a predetermined time, since it is able to be used soon, it may be determined that the error has exceptionally an influence even in the state in which the usage is restricted.

If it is determined in S508 that the error has an influence (YES in S508), the error extracted in S107 is notified to the user (S109; an example of a notification unit). On the other hand, if it is determined that the error has no influence (NO in S508), S109 is skipped, and the error is not notified.

After notifying the error in S109, or if it is determined in S508 that the error has no influence (NO in S508), the error extracted in S107 is erased from the error list (S110), and then the process proceeds to S106.

According to the fifth illustrative embodiment described above, the PC 100 acquires the usage restriction list which is the usage restriction information for each user as the usage information, and determines whether the error acquired from the MFP 200 has an influence on the user utilizing the PC 100, based on the usage restriction list. For the error having no effect, it is determined that the error is not notified to the user. In this way, similar to the second example, the error to be notified is limited to the errors that affect the user utilizing the PC 100, so that it can be expected to reduce the confusion of the user utilizing the PC 100.

In the fifth illustrative embodiment described above, although the MFP 200 has information about the usage restriction, and prepares the usage restriction list, a device other than the MFP 200, for example, the server 400, may have the information about the usage restriction.

Figure 12:
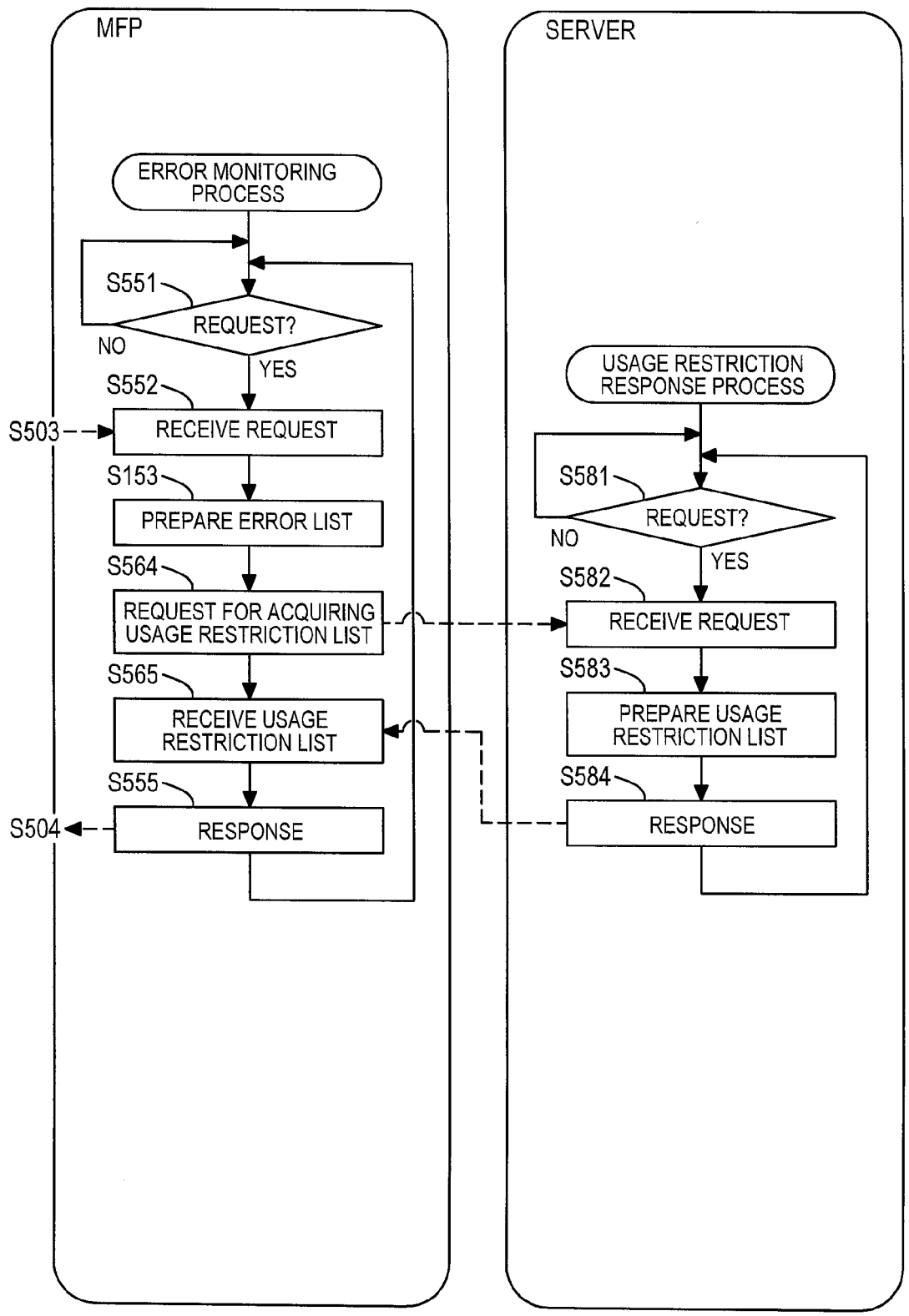
FIG. 12 is a flowchart illustrating an operation procedure of a modified embodiment in which the MFP acquires restriction information from a server, according to the fifth illustrative embodiment.

FIG. 12 shows an operation procedure of the error response process of the MFP 200, and an operation procedure of the usage restriction response process to be executed by the server 400, in the case where the server 400 has the usage restriction information DB 241 which is the information about the usage restriction. In this case, as the error response process, instead of preparing the usage restriction list, a request for acquiring the usage restriction list is output to the server 400 (S564). After the output in S564, the MFP 200 waits until the response is received from the server 400.

After started, in the usage restriction response in the server 400, it is determined whether there is the request for acquiring for the usage restriction list (S581). If there is no request for acquiring for the usage restriction list (NO in S581), the server 400 waits until the request for acquiring for the usage restriction list is received.

If there is the request for acquiring for the usage restriction list (YES in S581), the acquisition request is received (S582). The usage restriction list is prepared with reference to the usage restriction information (S583).

After S583, the prepared usage restriction list is transmitted to the image processing apparatus (MFP 200 in this example) which requests the acquisition. That is, the request for acquiring the usage restriction list is responded (S255). After S584, the process proceeds to S581, and the server 400 waits until the request for acquiring the usage restriction list is received.

The MFP 200 receives the usage restriction list prepared by the server 400, as the response from the server 400 (S565; an example of the usage information acquisition unit). Then, the received usage restriction list is transmitted to the PC 100. In this way, the server 400 manages the usage restriction information, thereby decreasing the load of the MFP 200.

In the example described above, although the MFP 200 acquires the usage restriction list from the server 400, and transmits the usage restriction list to the PC 100, but the PC 100 may obtain the usage restriction list from the server 400.

Figure 13:
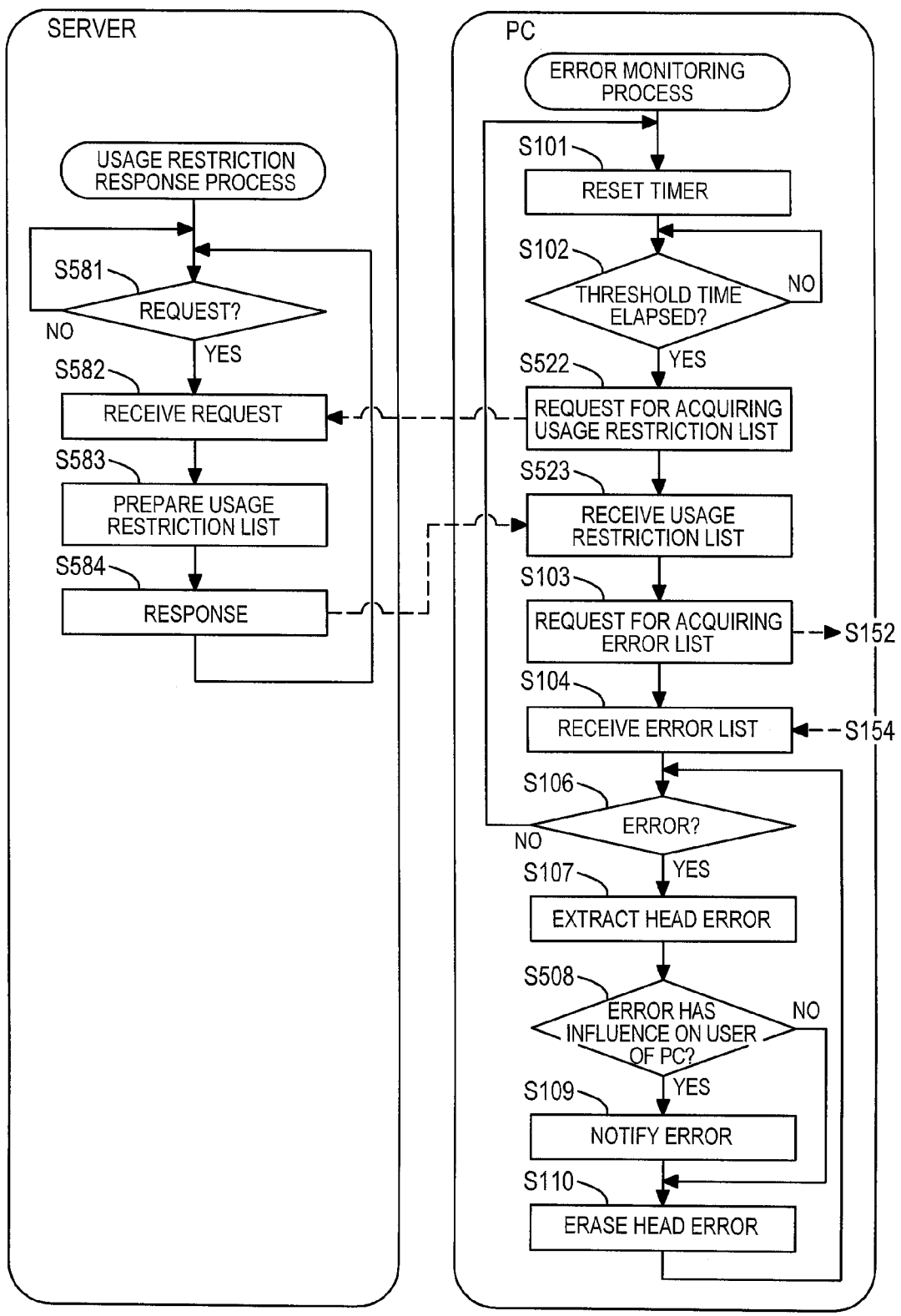
FIG. 13 is a flowchart illustrating an operation procedure of a modified embodiment in which the PC acquires restriction information from a server, according to the fifth illustrative embodiment.

FIG. 13 shows an operation procedure of the error monitoring process of the PC 100 and, and an operation procedure of the usage restriction response process to be executed by the server 400, in the case where the server 400 has the usage restriction information DB 241 which is the information about the usage restriction. In this case, as the error monitoring process, separately from the request for acquiring the error list, a request for acquiring the usage restriction list is output to the server 400 (S522). After the output in S522, the PC waits until the response is received from the server 400.

After receiving the request for acquiring the usage restriction list (S583), as illustrated in FIG. 12, as the usage restriction response process of the server 400, the usage restriction list is prepared with reference to the usage restriction information DB 241 (S583). After S583, the prepared request for acquiring the usage restriction list is transmitted to the information processing apparatus (PC 100 in this illustrative embodiment).

As the response from the server 400, the PC 100 receives the usage restriction list prepared by the server 400 (S523; an example of the usage information acquisition unit). The PC 100 outputs the request for acquiring the error list to the MFP 200, separately from the usage restriction list (S103). In this instance, the error response process of the MFP 200 is same as that of the first illustrative embodiment illustrated in FIG. 7. After receiving the error list in S104, the presence or absence of the error is determined (S106). Any one of the request of acquiring the error list and the request for acquiring the user restriction list may be ahead or may be processed simultaneously. The process after S106 is similar to FIG. 11. Since the PC 100 directly sends inquires to the server 400, it is possible to further reduce the load of the MFP 200.

[Sixth Illustrative Embodiment]

Figure 14:
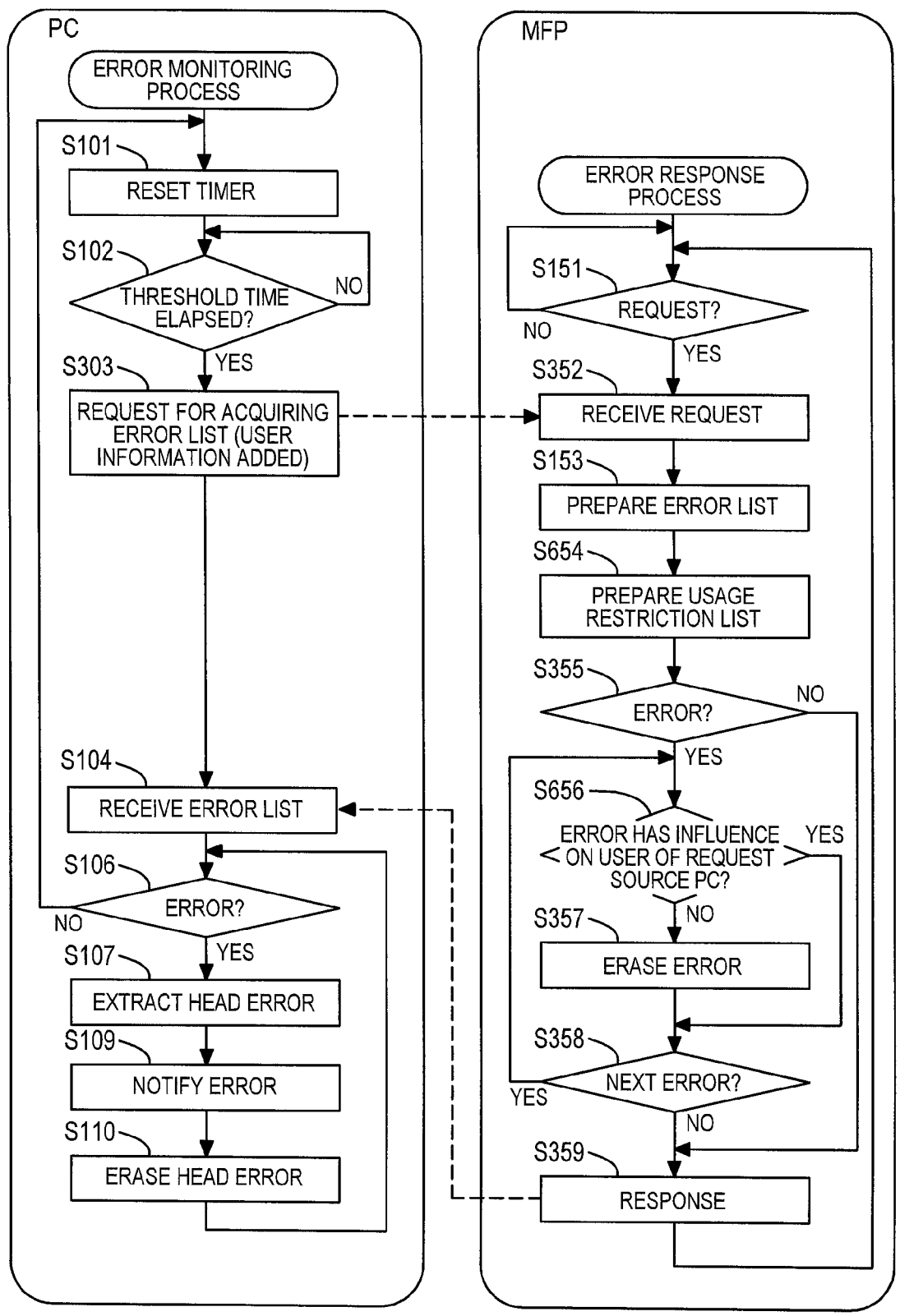
FIG. 14 is a flowchart illustrating an operation procedure of the PC and the MFP according to a sixth illustrative embodiment.

Next, the operation of the image processing system of the sixth illustrative embodiment will be described with reference to the flowchart of FIG. 14. The sixth illustrative embodiment is another embodiment of the third illustrative embodiment, in which the MFP 200 acquires the usage information, and it is determined whether the MFP 200 notifies the PC 100 of the error, and the information about the usage restriction is intended to use the usage information, as the fifth illustrative embodiment. FIG. 14 illustrates two processes, that is, the error monitoring process executed by the PC 100 and the error response process executed by the MFP 200, as illustrated in FIG. 7 or the like. The same processes as those of the first illustrative embodiment or the third illustrative embodiment are denoted by the same reference numerals, and its description will be simplified.

In the error monitoring process of the sixth illustrative embodiment, first, the timer is reset, and the timer is restarted (S101). After that, the PC waits until the measured time of the timer passes a threshold time (S102).

If the time has passed the threshold time (YES in S102), the PC 100 outputs a request for acquiring the error list, to which the user information is added, to the MFP 200 (S303). After the output in S303, the PC 100 waits until it receives a response from the MFP 200.

After started, in the error response process of the MFP 200, it is determined whether there is the request for acquiring the error list (S151). If there is no request for acquiring the error list (NO in S151), the MFP 200 waits until the request for acquiring the error list is received.

If there is the request for acquiring the error list (YES in S151), the MFP 200 receives the acquisition request and the user information added thereto (S152). After that, the MFP 200 prepares the error list with reference to the status information DB 240 (S153; an example of the error information acquisition unit). Then, with reference to the usage restriction information DB 241, a usage restriction list is prepared for a user corresponding to the user information received in S352, that is, the user of the request source PC (S654; an example of the usage information acquisition unit). S153 and S654 may be carried out in a reverse order.

Next, it is determined whether an error exists in the error list prepared (S355). If there is an error (YES in S355), it is determined whether the error that is registered in the head of the error list has an influence on the user of the request source PC (S656; as a determination unit). Specifically, it is determined that the error has no influence on the image processing operation whose usage is restricted, and it is determined that the error has an influence on the image processing operation whose usage is not restricted.

If it is determined in S656 that the error has no influence (NO in S656), the error is erased from the error list which is an object to be determined in S656 (S357). On the other hand, if it is determined in S656 that the error has an influence (YES in S656), 5357 is skipped, and the information about the error is left in the error list. After the error is erased in S357, or if it is determined that the error has the influence in S656, it is determined whether there is a next error (S358). If there is a next error (YES in S358), the next error is selected, and the process proceeds to S656.

On the other hand, if there is no error (NO in S355), or if there is no next error (NO in S358), the error list is transmitted to the request source PC. That is, the MFP 200 responses to the request for acquiring the error list (S359).

Returning to the description of the error monitoring process of the PC 100, the error list prepared by the MFP 200 is received as the response from the MFP 200 (S104). Next, it is determined whether the error exits in the error list acquired (S106). If the error exits (YES in S106), the error registered at a head of the error list is extracted (S107). After S107, the extracted error is notified to the user (S109; an example of a notification unit). After S109, the notified error is erased from the error list (S110), and the process proceeds to S106.

According to the sixth illustrative embodiment described above, the MFP 200 acquires the usage restriction list which is the usage restriction information for each user, as the usage information, and determines whether the currently occurring error has an influence on the user utilizing the request source PC, based on the usage restriction list. If it is determined that the error has no effect, the error is not notified to the request source PC. That is, it is determined that the error is not notified to the request source PC. In this way, similar to the third illustrative embodiment, the error to be notified is limited to the errors which affect the user utilizing the PC 100, so that it can be expected to reduce the confusion of the user utilizing the PC 100.

In addition, in the sixth illustrative embodiment described above, although MFP 200 has the information about the usage restriction, and prepares the usage restriction list, a device other than the MFP 200, for example, the server 400, may include the information about the usage restriction.

Figure 15:
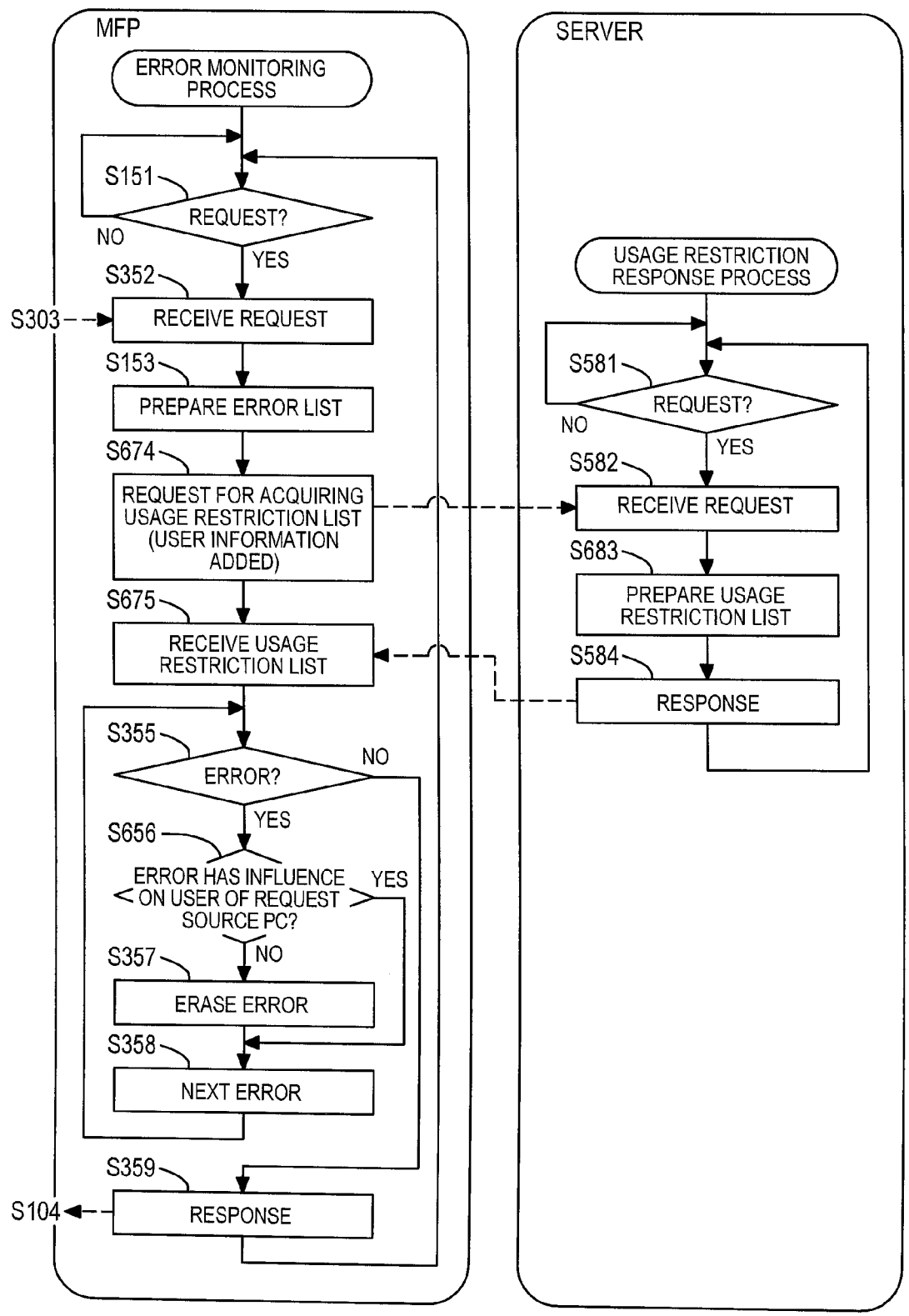
FIG. 15 is a flowchart illustrating an operation procedure of a modified embodiment in which the MFP acquires restriction information from a server, according to the sixth illustrative embodiment.

FIG. 15 shows an operation procedure of the error response process of the MFP 200, and an operation procedure of the usage restriction response process executed by the server 400, in the case where the server 400 has the usage restriction information DB 241 which is the information about the usage restriction. In this case, as the error response process, instead of preparing the usage restriction list, a request for acquiring the usage restriction list is output to the server 400 (S674). The user information received in S352 is added to the acquisition require. After the output in S674, the MFP 200 waits until the response is received from the server 400.

Similarly to FIG. 12, in the usage restriction information process of the server 400, the request for acquiring the usage restriction list is received simultaneously with the user information (S582). After that, the usage restriction list for the user of the request source PC is prepared with reference to the usage restriction DB 241 (S683). After S683, the prepared usage restriction list is transmitted to the image processing apparatus making the acquisition request (MFP 200 in this example).

The MFP 200 receives the usage restriction list prepared by the server 400, as the response from the server 400 (S675; an example of the usage information acquisition unit). Based on the received usage restriction list, it is determined whether the error is displayed on the request resource PC. Since the server 400 manages the usage restriction information, it is possible to reduce the load of the MFP 200.

[First Modified Embodiment]

Figure 16:
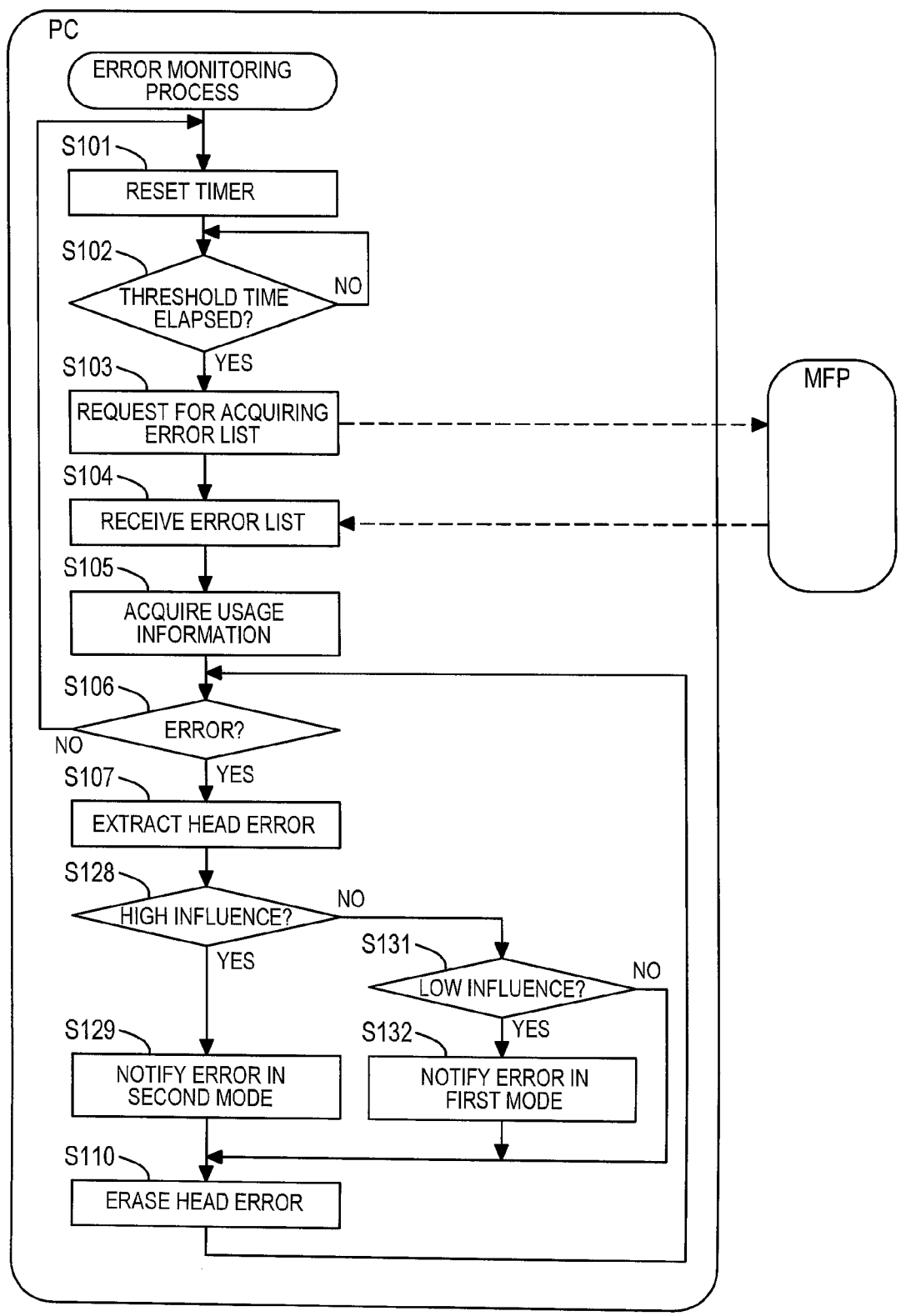
FIG. 16 is a flowchart illustrating an operation procedure of the PC according to a first modified embodiment.

Next, a modified embodiment of the first illustrative embodiment will be described with reference to FIG. 16. In a first modified embodiment, a notification mode of the error is changed depending upon the degree of influence factor on the user. This is different from the first illustrative embodiment in which the notification mode is not changed. The same processes as those of the first illustrative embodiment are denoted by the same reference numerals, and its description will be simplified. Also, since the error response process of the MFP 200 is same as that of the first illustrative embodiment, the description thereof will be omitted.

An error monitoring program 71 of the first modified embodiment has a first mode and a second mode having a degree of notification which is stronger than that of the first mode, as a display mode when the error is notified. The second mode is a mode to be executed in preference to other processes. For example, if the first mode is the screen display of the error contents, the second mode corresponds to an additional mode, of which at least one of pop-up display, blinking, and ringing of warning sound is added to the screen display.

In the error monitoring process of the first modified embodiment, the processes from S101 to S107 are same as those of the first illustrative embodiment. On the other hand, after the error is extracted in S107, it is determined whether the error has a high degree of influence, based on the usage information of the user utilizing the PC 100 (S128). If the error does not have a high degree of influence (NO in S128), it is determined whether the error has a low degree of influence (S131). If the error is not a low degree of influence (NO in S131), the process proceeds to S110, and the error is not notified.

For the error having the high or low degree of influence, for example, it is determined that the degree of influence is high if the error occurs in the job which is input by the user of the PC 100, while it is determined that the degree of influence is low if the error occurs in the job which is input by the user other than the user of the PC 100. Specifically, for example, in the case where the error related to the printer occurs, the error is the object to be notified if the printer driver is installed. Further, if there is a print job of transmission incompletion in the PC 100, it is determined that the degree of influence is high. If there is no print job of transmission incompletion in the PC 100, it is regarded that the error occurs by the job input by other user, and the it is determined that the degree of influence is low.

In addition, the high or low degree of influence of the error may be determined on the basis of the usage restriction status of the user utilizing the PC 100. For example, if the remaining numbers of the print is equal to or more than a threshold value, it is determined that the error related to the print has the high degree of influence. If the remaining numbers of the print is more than 0 and equal to or less than a threshold value, it is determined that the error related to the print has the low degree of influence. In this instance, the PC 100 acquires the information about the usage restriction from the MFP 200 or the server 400 in advance.

If the error has the high degree of influence (YES in S128), the error is notified in the second mode (S129). This allows the user to call attention strongly, so that the immediate response by the user can be expected. On the other hand, if the error has the low degree of influence (YES S131), the error is notified in the first mode (S132). If the error does not have the low degree of influence (NO in S131), that is, the error has no effect, the error is not notified. Accordingly, the reduction of confusion of the user utilizing the PC 100 can be expected. For the error having the high degree of urgency, the possibility of enabling the user utilizing the PC 100 to recognize the error can be high.

In addition, although the notification mode of the error is changed in the first mode and the second mode according to the degree of influence of the error in the first modified embodiment described above, the notification mode of the error may be changed in the first mode and the second mode according to the usage information of the user. For example, it may be configured to notify the error having influence on the user in the second mode and notify the error having no influence on the user in the first mode.

[Second Modified Embodiment]

Figure 17:
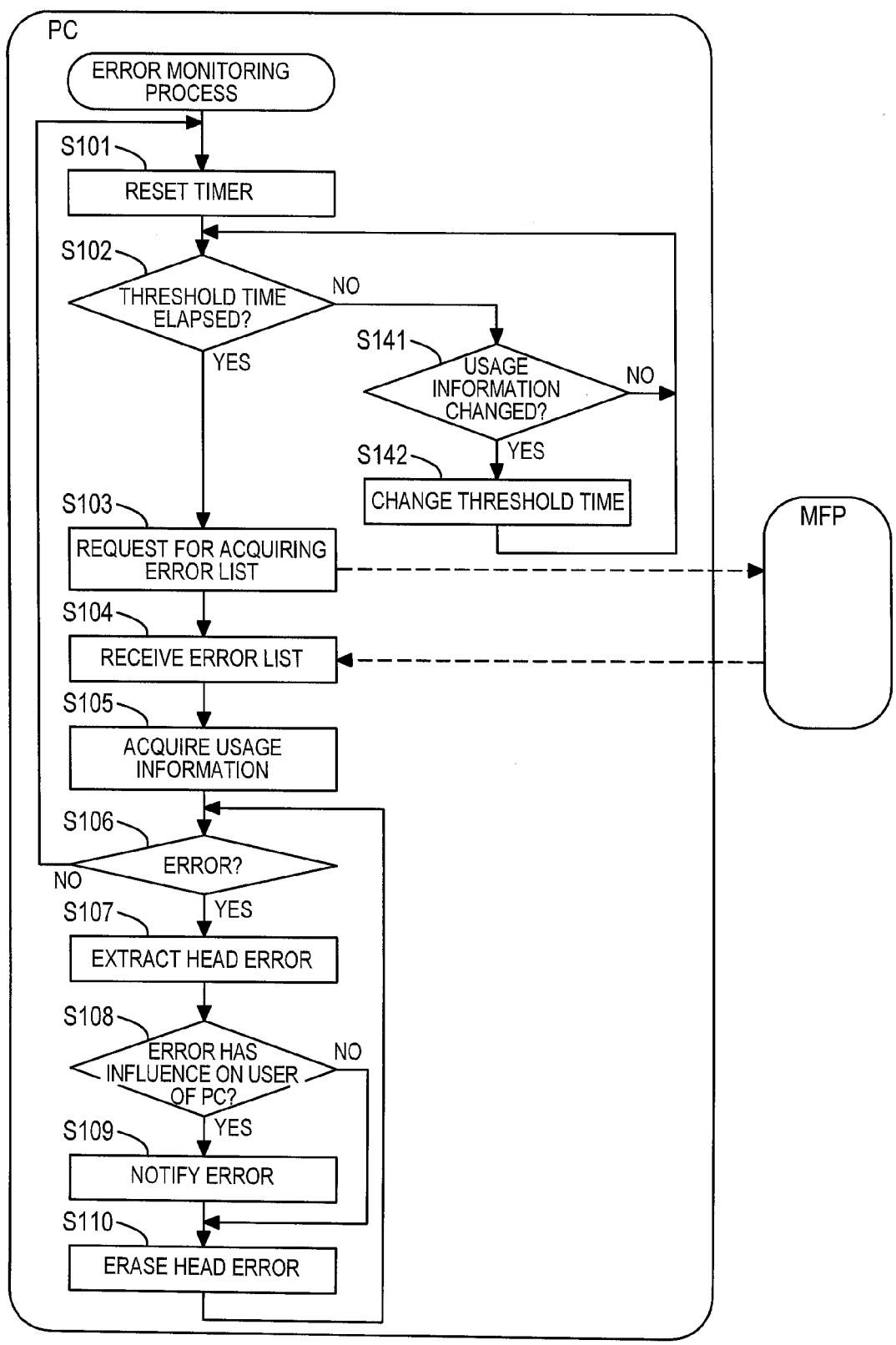
FIG. 17 is a flowchart illustrating an operation procedure of the PC according to a second modified embodiment.

Next, a second modified embodiment will be described with reference to the flowchart of FIG. 17. In the second modified embodiment, a frequency of acquiring the error information is changed according to the usage information of the MFP 200. This is different from the first illustrative embodiment in which the frequency is not changed. The same processes as those of the first illustrative embodiment are denoted by the same reference numerals, and its description will be simplified. Also, since the error response process of the MFP 200 is equal to that of the first illustrative embodiment, the description thereof will be omitted.

In the error monitoring process of the second modified embodiment, the processes from S101 to S102 are same as those of the first illustrative embodiment. In addition, in S102, the process after passing the threshold time (YES in S102) is same as that of the first illustrative embodiment.

On the other hand, in 5102, if it have not passed the threshold time (NO in S102), it is determined whether the usage information of the MFP 200 is changed or not (S141). If the usage information of the MFP 200 is changed (YES in S141), the threshold time is changed as needed (S142). After S142, or if the usage information of the MFP 200 is not changed (NO in S141), the process proceeds to S102.

The change in usage information of the MFP 200 corresponds to, for example, that the PC 100 starts transmitting or receiving the job for the MFP 200, or the device driver for the MFP 200 is installed. If the transmission or reception of the job is started, the probability that an error will occur in the MFP 200 due to the job of the PC 100 is high. For this reason, it is preferable to shorten the threshold time. In addition, if the device driver is installed, the use frequency of the MFP 200 is high as much as it. Therefore, it is preferable to shorten the threshold time.

Also, it is preferable to change the frequency depending on the type of device driver installed. For example, if the printer driver is installed, the probability of error is increased, since consumable products such as sheets or colorants are highly used. For this reason, the threshold time is set to be further shortened. On the other hand, the use of the consumable products is small in the scanning process. Therefore, if the scanner driver is installed, the threshold time is set to be long, as compared with the printer driver.

It is also possible to change the frequency by setting the operating conditions of each image process. For example, since color printing uses the large number of colorants to be used than monochrome printing, the probability of the error is increased. Therefore, as compared with the case where the monochrome printing is set, the threshold time is set to be short.

It is also possible to change the frequency according to the restriction status of the usage restriction. For example, in the case where the usage is prohibited, if the remaining available number of times is 0, the MFP 200 cannot be used for the image processing operation. Therefore, if the MFP 200 is no longer used for at least one image processing operation, the threshold time may be set to be long, as compared with the case of using the image processing operation which is a usage restriction object. In addition, when there are plural image processing operations which are the user restriction object, the more image processing operations whose usage is restricted, the threshold time is set to be longer.

That is, the higher the using possibility of the MFP 200, the higher the utility value of the error information. On the other hand, even though the error information is frequently acquired under the circumstance in which the using possibility of the MFP 200 is low, it results in wasteful in the processing. For this reason, the frequency to acquire the error information may be changed such that the frequency becomes higher as the using possibility is higher.

The first modified embodiment and the second modified embodiment are the modified embodiments of the first illustrative embodiment, but can be similarly applied to the second to sixth illustrative embodiments.

[Third Modified Embodiment]

Figure 18:
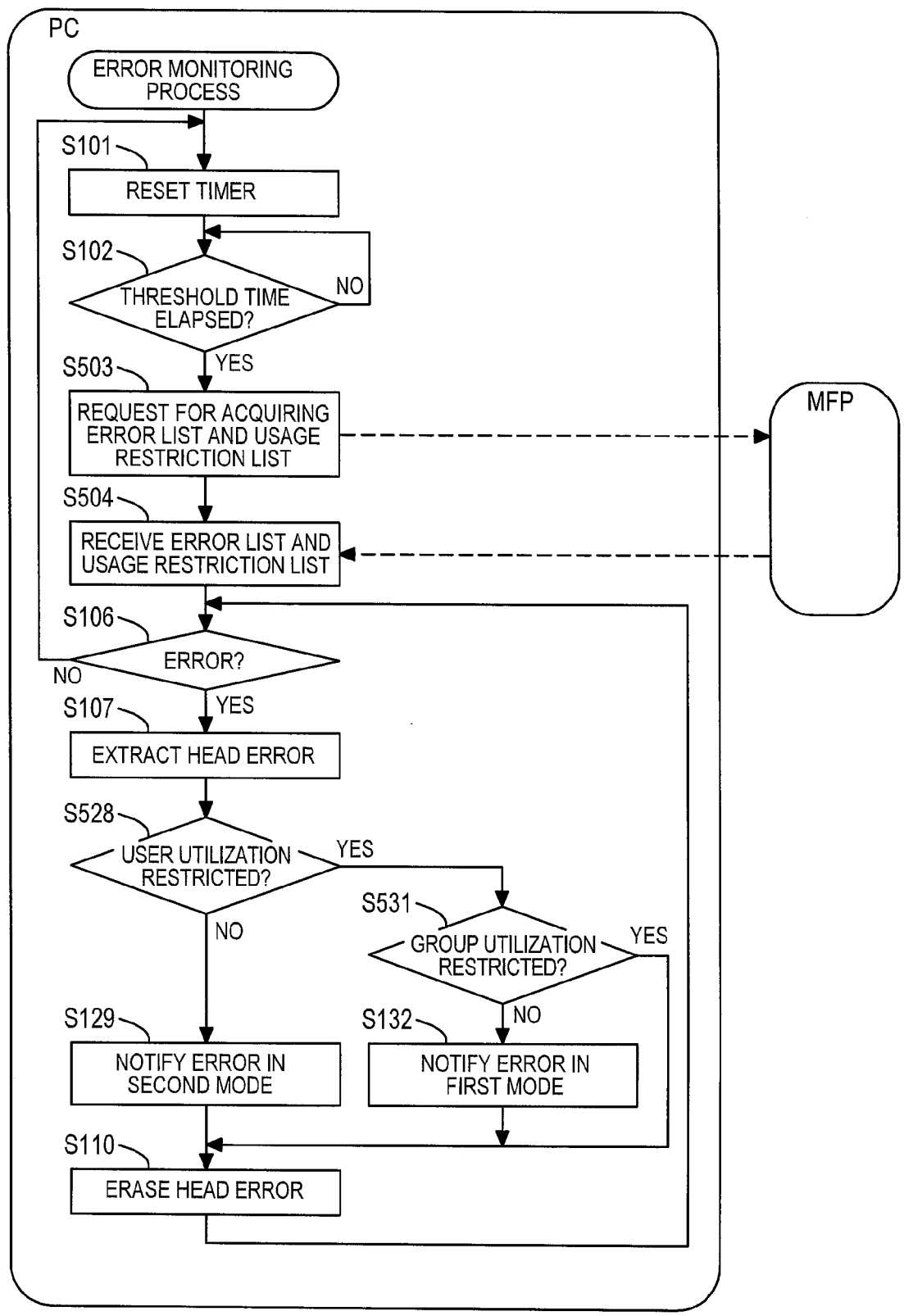
FIG. 18 is a flowchart illustrating an operation procedure of the PC according to a third modified embodiment.

Next, a third modified embodiment will be described with reference to the flowchart of FIG. 18. In the third modified embodiment, a notification mode of the error is changed according to the contents of the usage restriction. This is different from the fifth illustrative embodiment in which the notification mode is not changed. Further, the same processes as those of the fifth illustrative embodiment are denoted by the same reference numerals, and its description will be simplified. Also, since the error response process of the MFP 200 is same as that of the fifth illustrative embodiment, the description thereof will be omitted.

An error monitoring program 71 of the third modified embodiment includes a first mode having a low degree of notification and a second mode having a high degree of notification, as a display mode when the error is notified.

In the third modified embodiment, a restriction can be set to a group basis to which plural users belong, as well as a user basis. For example, in the case where the use prohibition is set for a group a to which a user A and a user B belong, both the user A and the user B are prohibited from using the printing function. In the case where the usage by at least one of an individual user and a group to which each user belongs is restricted, each user becomes an object of the usage restriction. Also, an affiliation of the user constituting the group may be an organized affiliation (e.g., department or club of a company), or may be a positional affiliation (e.g., plant or floor), or may be a logical affiliation in communication (e.g., network or communication protocol).

In the error monitoring process of the third modified embodiment, the processes from S101 to S107 are same as those of the fifth illustrative embodiment. After extracting the error in S107, it is determined whether the error is an error related to the image processing operation whose usage by the user utilizing the PC 100 is restricted (S528). For the error related to the image processing operation whose usage is not restricted (NO in S528), the error is notified in the second mode (S129). When the usage is not restricted, since the degree of influence on the use utilizing the PC 100 is large, the user attention may be called strongly.

On the other hand, for the error related to the image processing operation whose usage is restricted (YES in S528), it is determined whether the error is an error related to the image processing operation whose usage by the group to which the user belongs is restricted (S531). If the usage by an individual user is restricted, but the usage by a group to which the user belongs is not restricted, measurement such as error cancellation is needed for the user, so that the usage restriction may be canceled. For this reason, for the error related to the image process operation whose usage by the group is not restricted (NO in S531), the error is notified in the first mode (S132). For the error related to the image process operation whose usage by the group is restricted (YES in S531), the process proceeds to S110, and thus the error is not notified.

Figure 19:
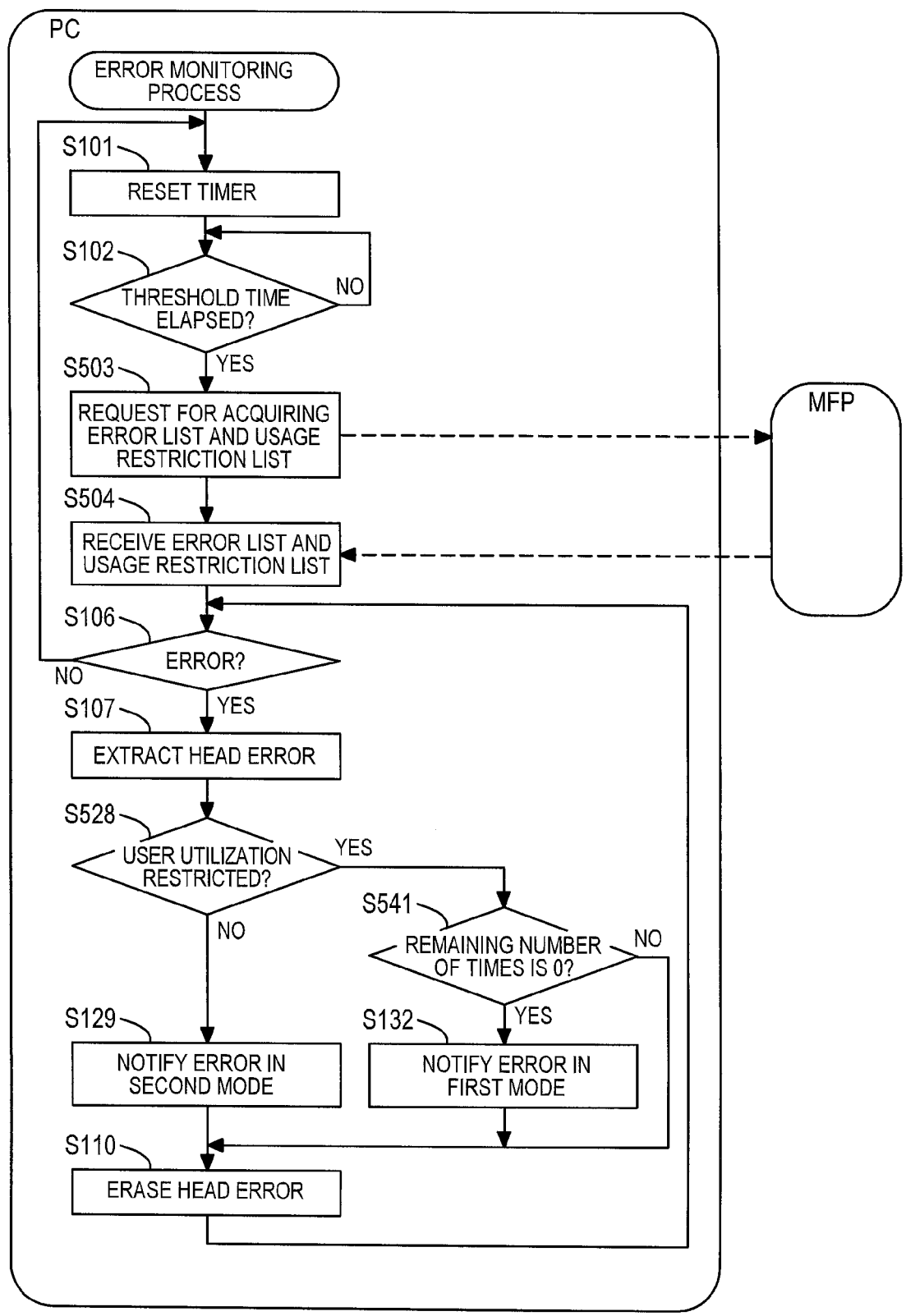
FIG. 19 is a flowchart illustrating an operation procedure of the PC according to another embodiment of the third modified embodiment.

Also, as a technique for changing the notification mode of the error in accordance with the contents of the usage restriction, for example, the notification mode may be determined in accordance with the status of the usage restriction. FIG. 19 shows another example of the third modified embodiment. In this embodiment, after the error is extracted in S107, it is determined whether the error is an error related to the image processing operation whose usage by the user utilizing the PC 100 is restricted (S528). For the error related to the image process operation whose usage is not restricted (NO in S528), the error is notified in the second mode (S129).

On the other hand, for the error related to the image process operation whose usage is restricted (YES in S528), in which the usage restriction is a usage restriction that the reaming number of times is 0 in a specific image processing operation, it is determined whether the error is an error related to the specific image processing operation (S541). If the usage is restricted from the operation of which the remaining number of times is 0, it may be used by resetting the remaining number of times. For this reason, for the error satisfying the condition of S541 (YES in S541), the error is notified in the first mode (S132). On the other hand, if the usage restriction is the usage prohibition (NO in S541), since the possibility of allowing the usage tends to be lower than the possibility in that the remaining number of times is reset, the proceeds to S110, and the error is not notified.

The notification mode is changed depending upon the degree of influence on the user by changing the notification mode of the error in accordance with the contents of the usage restriction. Accordingly, it is possible to reduce the confusion of the user utilizing the PC 100. For the error having the high degree of urgency, the possibility of enabling the user utilizing the PC 100 to recognize the error can be high.

In the third modified embodiment described above, the notification mode of the error is changed in the first mode or the second mode depending upon whether the usage by the individual user or the group is restricted. However, it may be configured to determine whether the error is notified depending upon which of the usage by the individual user or the group the usage is restricted. For example, in the case where the usage by the individual user is restricted, but the usage by the group is not restricted, since it needs to cancel the error, there may be configured to notify the error. In this instance, in the case where usage by both the individual user and the group are restricted, the error is not notified.

Further, in the third modified embodiment described above, the error monitoring program 71 determines whether to select the notification mode of the error in either one of the first mode and the second mode. However, the MFP 200 may make such determination. For example, when it is determined whether the error is notified or not in the error response process of the third illustrative embodiment, it is preferable to also determine the notification mode of the error, and then to respond to the PC 100 together with the determined notification mode.

[Fourth Modified Embodiment]

Figure 20:
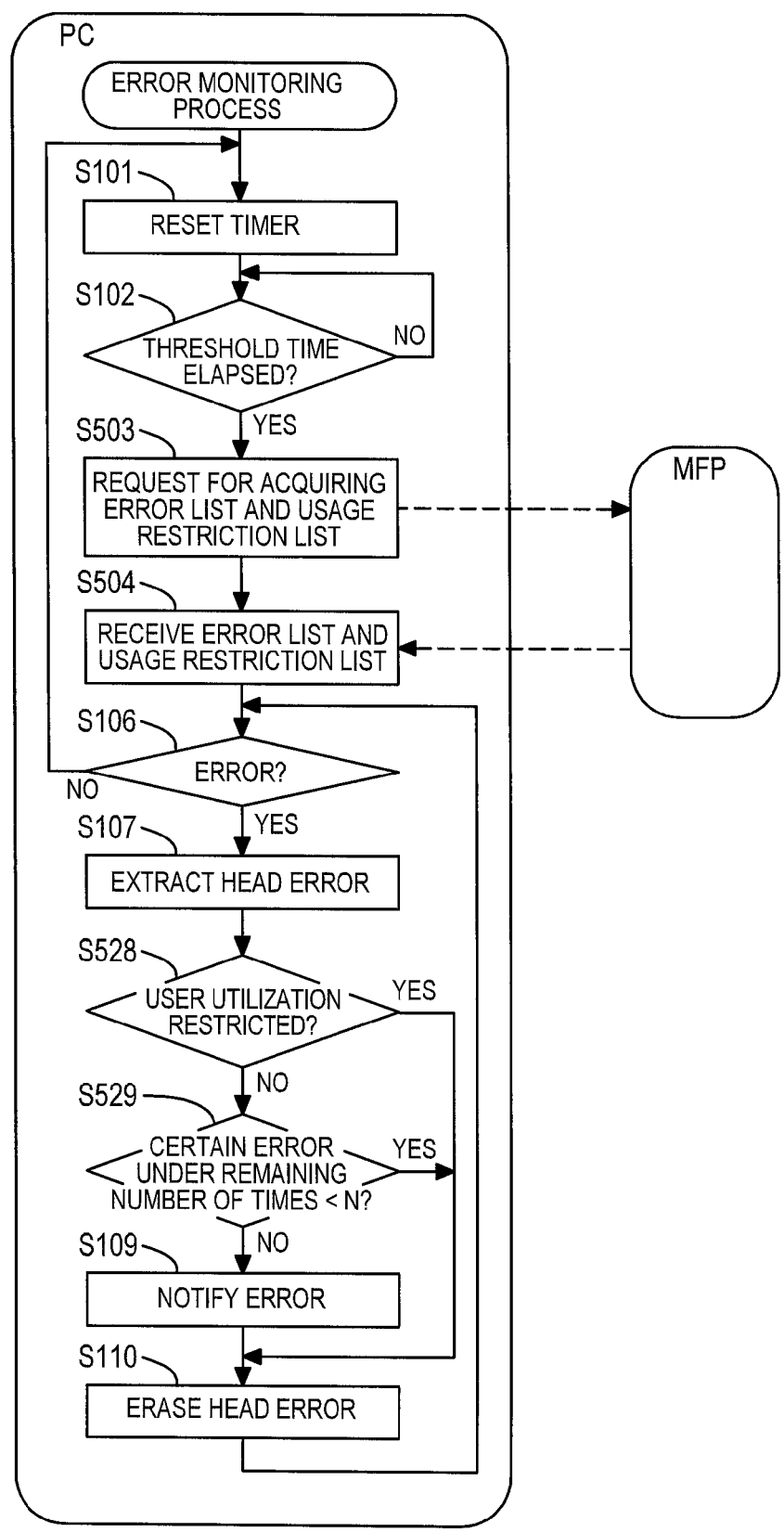
FIG. 20 is a flowchart illustrating an operation procedure of the PC according to a fourth modified embodiment.

Next, the fourth modified embodiment will be described with reference to the flowchart of FIG. 20. In the fourth modified embodiment, even if the error related to the image processing operation whose usage is not restricted satisfies a predetermined condition, the error is not notified. This is different from the fifth illustrative embodiment in which the error related to the image processing operation whose usage is not restricted is notified. The same processes as those of the fifth illustrative embodiment are denoted by the same reference numerals, and its description will be simplified. Also, since the error response process of the MFP 200 is same as that of the fifth illustrative embodiment, the description thereof will be omitted.

In the error monitoring process of the fourth modified embodiment, the processes from S101 to S107 are same as those of the fifth illustrative embodiment.

After extracting the error in S107, it is determined whether the error is an error related to the image processing operation whose usage by the user utilizing the PC 100 is restricted (S528). For the error related to the image processing operation whose usage is restricted (YES in S528), the process proceeds to S110, and the error is not notified.

For an error of an image processing operation whose usage is not restricted (NO in S528), it is determined whether the remaining number of printing times is smaller than N (a natural number greater than 0) and the error is a predetermined error (the error indicating that a remaining amount of colorants is equal to or less than a threshold value in this example) (S529).

If the condition of S259 is satisfied (YES in S529), since the notification of the error indicating that the remaining amount of the colorants is small to the user having the small numbers of printable times has a small effect on the user, the process proceeds to S110, and the error is not notified. In the case of not satisfying the condition of S529 (NO in S529), since the effect on the user is large, the error is notified.

In addition, in the fourth modified embodiment described above, the PC 100 determines the avoidance of the error notification according to the remaining number of print times and the remaining amount of colorants, but the MFP 200 may make such determination. For example, in a modified embodiment of the sixth illustrative embodiment illustrated in FIG. 14, in the case where the usage by the user utilizing the request source PC is not restricted, the error may be erased from the error list if the remaining number of print times is smaller than N and the error is an error indicating the lack of colorants when the MFP 200 erases the error from the error list.

As described in detail above, in the image processing system of the illustrative embodiments, it is determined whether the error occurring in the MFP 200 is to be notified based on the usage information of the MFP 200. The PC 100 notifies the error which is determined to be notified (in other words, PC does not notify the error which is not determined to be notified), so that the notified error is limited to the error having an influence on the user utilizing the PC 100. As a result, it can be expected to reduce the confusion of the user utilizing the PC 100.

While the present invention has been shown and described with reference to certain illustrative embodiments thereof, it will be understood by those skilled in the art that various changes in form and details may be made therein without departing from the spirit and scope of the invention as defined by the appended claims.

For example, as long as the MFP has the image processing function, it may be a printer, a scanner, a copying machine, and a FAX machine. Also, as long as the PC is an apparatus capable of inputting the image processing job to the image processing apparatus, it may be a smart phone or a PDA device.

In the above illustrative embodiments, the timer determines the timing at which the request for acquiring the error list is output from the PC 100. However, the present invention is not limited thereto. For example, the request for acquiring the error list may be output in accordance with the instruction from the user. That is, it is not necessary to output periodically the request for acquiring the error list from the PC 100, and the request for acquiring the error list may be output from the PC 100 at any timing.

Further, in the above illustrative embodiments, the timing of acquiring the error list is determined by the timer of the PC 100. However, the present invention is not limited thereto. For example, it may be configured to automatically transmit the error list to the PC 100 from the MFP 200 by installing the timer in the MFP 200.

Further, the PC 100 of the above illustrative embodiments dedicatedly includes the driver information DB 140 storing the information on the device drivers of the PC itself, and the condition information DB storing the operating conditions of each drive driver. However, if a database provided by OS (e.g., Registry, if OS is Microsoft Windows™) is available, that database may be used.

Further, the processes described in the above illustrative embodiments may be carried out by a single CPU, plural CPUs, hardware of ASIC or the like, or a combination thereof. Also, the processed described in the above illustrative embodiments may be realized by several aspects such as a recording medium stored with a program to execute the process, or a method.

What is claimed is:

1. A non-transitory computer-readable medium having a program stored thereon and readable by a processor of an information processing apparatus configured to communicate with an image processing apparatus, the program, when executed by the processor, causing the information processing apparatus to perform:
    acquiring error information indicating an error occurring in the image processing apparatus from the image processing apparatus and usage information of the image processing apparatus;
    determining whether to notify the acquired error information based on the acquired usage information; and
    notifying a user of the acquired error information if it is determined to notify the acquired error information;
    wherein the usage information includes user restriction information indicating a usage restriction for restricting execution of an image processing operation of the image processing apparatus for each user and group restriction information indicating a usage restriction for restricting execution of the image processing operation of the image processing apparatus for each group of users,
    wherein the determining includes determining to notify the acquired error information related to the image processing operation which is not restricted to be executed by a user currently using the information processing apparatus, in a second notification mode, determining to notify the acquired error information related to the image processing operation which is restricted to be executed by the user currently using the information processing apparatus but is not restricted to be executed by a group which the user belongs to, in a first notification mode which is different from the second notification mode, and determining not to notify the acquired error information if the acquired error information is related to the image processing operation of the image processing apparatus which is restricted to be executed by the user currently using the information processing apparatus and is restricted to be executed by the group which the user belongs to, based on the acquired user restriction information and the acquired group restriction information,
    wherein if the determining determines to notify the acquired error information in the second notification mode, the notifying notifies the acquired error information in the second notification mode,
    wherein if the determining determines to notify the acquired error information in the first notification mode, the notifying notifies the acquired error information in the first notification mode, and
    wherein if the determining determines not to notify the acquired error information, the notifying does not notify the acquired error information.

2. The computer-readable medium according to claim 1, wherein the acquiring includes acquiring the user restriction information from a server which is communicated with the information processing apparatus.

3. The computer-readable medium according to claim 1, wherein in the first notification mode, the notifying includes displaying a first screen, and in the second notification mode, the notifying includes displaying the first screen and an additional notification.

4. A non-transitory computer-readable medium having a program stored thereon and readable by a processor of an information processing apparatus configured to communicate with an image processing apparatus, the program, when executed by the processor, causing the information processing apparatus to perform:
    acquiring error information indicating an error occurring in the image processing apparatus from the image processing apparatus and usage information of the image processing apparatus;
    determining whether to notify the acquired error information based on the acquired usage information; and
    notifying a user of the acquired error information if it is determined to notify the acquired error information;
    wherein the usage information includes user restriction information indicating a usage restriction for restricting execution of an image processing operation of the image processing apparatus for each user;
    wherein the determining includes determining to notify the acquired error information related to the image processing operation which is not restricted to be executed by a user currently using the information processing apparatus, in a second notification mode, determining to notify the acquired error information related to the image processing operation which is restricted to be executed by the user currently using the information processing apparatus due to an available number of operation times being zero, in a first notification mode which is different from the second notification mode, and determining not to notify the acquired error information if the acquired error information is related to the image processing operation of the image processing apparatus which is restricted to be executed by a user currently using the information processing apparatus not due to an available number of operation times being zero, based on the acquired user restriction information;
    wherein if the determining determines to notify the acquired error information in the second notification mode, the notifying notifies the acquired error information in the second notification mode,
    wherein if the determining determines to notify the acquired error information in the first notification mode, the notifying notifies the acquired error information in the first notification mode, and
    wherein if the determining determines not to notify the acquired error information, the notifying does not notify the acquired error information.

5. The computer-readable medium according to claim 4, wherein the acquiring includes acquiring the user restriction information from a server which is communicated with the information processing apparatus.

6. The computer-readable medium according to claim 4, wherein in the first notification mode, the notifying includes displaying a first screen, and in the second notification mode, the notifying includes displaying the first screen and an additional notification.

7. A non-transitory computer-readable medium having a program stored thereon and readable by a processor of an information processing apparatus configured to communicate with an image processing apparatus, the program, when executed by the processor, causing the information processing apparatus to perform:

acquiring error information indicating an error occurring in the image processing apparatus from the image processing apparatus and usage information of the image processing apparatus;

determining whether to notify the acquired error information based on the acquired usage information; and notifying a user of the acquired error information if it is determined to notify the acquired error information;

wherein the usage information includes user restriction information indicating a usage restriction for restricting execution of an image processing operation of the image processing apparatus for each user, wherein the determining includes determining not to notify the acquired error information if the acquired error information is related to the image processing operation of the image processing apparatus which is restricted to be executed by a user currently using the information processing apparatus, based on the acquired user restriction information;

wherein the user restriction information includes the number of sheets which is allowed to be printed with the image processing apparatus for each user, and wherein the determining includes determining not to notify the acquired error information indicating a remaining amount of consumable material set in the image processing apparatus is being small if the number of sheets which are allowed to be printed by a user currently using the information processing apparatus is smaller than a threshold value, based on the acquired user restriction information.

8. The computer-readable medium according to claim 7, wherein the acquiring includes acquiring the user restriction information from a server which is communicated with the information processing apparatus.

9. A non-transitory computer-readable medium having a program stored thereon and readable by a processor of an information processing apparatus configured to communicate with an image processing apparatus, the program, when executed by the processor, causing the information processing apparatus to perform:

acquiring error information indicating an error occurring in the image processing apparatus from the image processing apparatus and usage information of the image processing apparatus;

determining whether to notify the acquired error information based on the acquired usage information; and notifying a user of the acquired error information if it is determined to notify the acquired error information;

wherein the usage information includes user restriction information indicating a usage restriction for restricting execution of an image processing operation of the image processing apparatus for each user, wherein the determining includes determining not to notify the acquired error information if the acquired error information is related to the image processing operation of the image processing apparatus which is restricted to be executed by a user currently using the information processing apparatus, based on the acquired user restriction information;

wherein the usage information includes group restriction information indicating a usage restriction for restricting execution of the image processing operation of the image processing apparatus for each group of users, and wherein the determining includes determining to notify the acquired error information related to the image processing operation which is restricted to be executed by a group which a user currently using the information processing apparatus belongs to, irrespective of whether the image processing operation is restricted to be executed by the user, based on the acquired user restriction information and the acquired group restriction information.

10. The computer-readable medium according to claim 9, wherein the usage information includes installation status information indicating an installation status of a control program in the information processing apparatus, the control program being configured to control an image processing operation of the image processing apparatus, and wherein the determining includes determining not to notify the acquired error information if the acquired error information is not related to the image processing operation which is controlled by the control program installed in the information processing apparatus.

11. The computer-readable medium according to claim 10, wherein the usage information includes operating condition information indicating an operating condition of the image processing operation which is controlled by the control program installed in the information processing apparatus, and wherein the determining includes determining not to notify the acquired error information if the acquired error information is not related to the image processing operation which is controlled under the operating condition, irrespective of whether the acquired error information is related to the image processing operation which is controlled by the control program installed in the information processing apparatus, based on the acquired installation status information and the acquired operating condition information.

12. The computer-readable medium according to claim 9, wherein the usage information includes job information of a job which has been input in the image processing apparatus, and wherein the determining includes determining not to notify the acquired error information if the acquired error information is not related to an image processing operation executed according to the job from the information processing apparatus, based on the acquired job information.

13. The computer-readable medium according to claim 12, wherein the job information includes pre-job information of a pre-input job which is stored in the information processing apparatus and to be input to the image processing apparatus.

14. The computer-readable medium according to claim 9, wherein the notifying includes notifying the acquired error information in either one of a first mode and a second mode.

15. The computer-readable medium according to claim 14, wherein the notifying includes notifying the acquired error information indicating an error occurring in a job input by the information processing apparatus in the second mode, and notifying the acquired error information indicating an error occurring in a job input by a device other than the information processing apparatus in the first mode.

16. The computer-readable medium according to claim 9, wherein the acquiring includes acquiring the user restriction information from a server which is communicated with the information processing apparatus.

17. An image processing apparatus comprising:
a communication unit configured to communicate with an information processing apparatus;
a processor; and memory storing computer-readable instructions, when executed by the processor, causing the image processing apparatus to perform:
  acquiring error information indicating an error occurring in the image processing apparatus and usage information of the image processing apparatus;
  determining whether to transmit, via the communication unit, the acquired error information to the information processing apparatus based on the acquired usage information; and
  transmitting the acquired error information to the information processing apparatus if it is determined to transmit the acquired error information;
wherein the usage information includes user restriction information indicating a usage restriction for restricting execution of an image processing operation of the image processing apparatus for each user, and
wherein the determining includes determining not to transmit the acquired error information to the information processing apparatus if the acquired error information is related to the image processing operation which is restricted to be executed by a user currently using the information processing apparatus, based on the acquired user restriction information;
wherein the user restriction information includes the number of sheets which is allowed to be printed with the image processing apparatus for each user, and
wherein the determining includes determining not to transmit the acquired error information indicating an remaining amount of consumable material set in the image processing apparatus is being small to the information processing apparatus if the number of sheets which is allowed to be printed by a user currently using the information processing apparatus is smaller than a threshold value, based on the acquired user restriction information.

18. The image processing apparatus according to claim 17,
wherein the usage information includes installation status information indicating an installation status of a control program in the information processing apparatus, the control program being configured to control an image processing operation of the image processing apparatus,
wherein the acquiring includes acquiring the installation status information of the image processing apparatus from the information processing apparatus via the communication unit, and
wherein the determining includes determining not to transmit the acquired error information to the information processing apparatus if the acquired error information is not related to the image processing operation which is controlled by the control program installed in the information processing apparatus, based on the acquired installation status information.

19. The image processing apparatus according to claim 18,
wherein the usage information includes operating condition information indicating an operating condition of the image processing operation which is controlled by the control program installed in the information processing apparatus,
wherein the acquiring includes acquiring the operating condition information from the information processing apparatus via the communication unit, and
wherein the determining includes determining not to transmit the acquired error information to the information processing apparatus if the acquired error information is not related to the image processing operation which is controlled under the operating condition, irrespective of whether the acquired error information is related to the image processing operation which is controlled by the control program installed in the information processing apparatus, based on the acquired installation status information and the acquired operating condition information.

20. The image processing apparatus according to claim 17,
wherein the usage information includes job information of a job which has been input to the image processing apparatus, and
wherein the determining includes determining not to transmit the acquired error information to the information processing apparatus if the acquired error information is not related to an image processing operation executed according to the job from the information processing apparatus, based on the acquired job information.

21. The image processing apparatus according to claim 20,
wherein the job information includes pre-job information of a pre-input job which is stored in the information processing apparatus and to be input to the image processing apparatus.

22. The image processing apparatus according to claim 17,
wherein the acquiring includes acquiring the restriction information from a server which is communicated with the image processing apparatus via the communication unit.

23. An image processing apparatus comprising:
a communication unit configured to communicate with an information processing apparatus;
a processor; and
memory storing computer-readable instructions, when executed by the processor, causing the image processing apparatus to perform:
  acquiring error information indicating an error occurring in the image processing apparatus and usage information of the image processing apparatus;
  determining whether to transmit, via the communication unit, the acquired error information to the information processing apparatus based on the acquired usage information; and
  transmitting the acquired error information to the information processing apparatus if it is determined to transmit the acquired error information;
wherein the usage information includes user restriction information indicating a usage restriction for restricting execution of an image processing operation of the image processing apparatus for each user, and
wherein the determining includes determining not to transmit the acquired error information to the information processing apparatus if the acquired error information is related to the image processing operation which is restricted to be executed by a user currently using the information processing apparatus, based on the acquired user restriction information;
wherein the usage information includes group restriction information indicating a usage restriction for restricting execution of the image processing operation of the image processing apparatus for each group of users, and
wherein the determining includes determining to transmit the acquired error information related to the image processing operation which is restricted to be executed by a group which a user currently using the information processing apparatus belongs to, irrespective of whether the image processing operation is restricted to be executed by the user, based on the acquired user restriction information and the acquired group restriction information.

24. The image processing apparatus according to claim 23, wherein the acquiring includes acquiring the restriction information from a server which is communicated with the image processing apparatus via the communication unit.

* * * * *